(12) United States Patent
Kojima et al.

(10) Patent No.: US 7,286,282 B2
(45) Date of Patent: Oct. 23, 2007

(54) WAVELENGTH CONVERSION METHOD, WAVELENGTH CONVERSION LASER, AND LASER BEAM MACHINING APPARATUS

(75) Inventors: Tetsuo Kojima, Tokyo (JP); Susumu Konno, Tokyo (JP); Junichi Nishimae, Tokyo (JP); Shinsuke Yura, Tokyo (JP); Kazutoshi Morikawa, Tokyo (JP); Atsuhiro Sono, Tokyo (JP); Yukio Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 441 days.

(21) Appl. No.: 10/853,223

(22) Filed: May 26, 2004

(65) Prior Publication Data

US 2004/0240492 A1    Dec. 2, 2004

(30) Foreign Application Priority Data

| May 26, 2003 | (JP) | ............................. 2003-147402 |
| May 26, 2003 | (JP) | ............................. 2003-147403 |
| Feb. 2, 2004 | (JP) | ............................. 2004-025741 |

(51) Int. Cl.
*G02F 1/35* (2006.01)
*H01S 3/10* (2006.01)

(52) U.S. Cl. .................... 359/326; 359/328; 372/21; 372/22

(58) Field of Classification Search ............ 372/21–23, 372/27; 359/326, 328
See application file for complete search history.

(56) References Cited

U.S. PATENT DOCUMENTS 4,272,694 A * 6/1981 Jacobs ....................... 359/329
5,117,126 A * 5/1992 Geiger ........................ 359/330
5,247,389 A * 9/1993 Beausoleil ................... 359/326
5,315,433 A   5/1994 Okazaki et al.
5,467,214 A * 11/1995 Heflinger et al. ........... 359/238
5,477,378 A * 12/1995 Johnson ...................... 359/326
5,732,095 A * 3/1998 Zorabedian ................... 372/22
5,848,079 A * 12/1998 Kortz et al. ................... 372/22
6,137,624 A * 10/2000 Taira .......................... 359/326
6,563,641 B2 * 5/2003 Zhao .......................... 359/495
6,791,753 B1 * 9/2004 Liu et al. .................... 359/498
2003/0043452 A1 * 3/2003 Heist ........................... 359/326

FOREIGN PATENT DOCUMENTS

| JP | 5-142607 | 11/1993 |
| JP | 6-110098 | 4/1994 |
| JP | 11-44897 | 2/1999 |
| JP | 2000-176669 | 6/2000 |

* cited by examiner

*Primary Examiner*—Minsun Oh Harvey
*Assistant Examiner*—Phillip Nguyen
(74) *Attorney, Agent, or Firm*—Leydig, Voit & Mayer, Ltd.

(57) ABSTRACT

A fundamental laser beam is wavelength converted through nonlinear optical crystals by traveling in one direction, sequentially through two nonlinear optical crystals arranged in series. A wavelength-converted laser beam is generated and includes wavelength-converted laser beams having polarized directions differing from each other by angles in a range from 45° to 90°. The two nonlinear optical crystals have crystal orientation axes differing by 45° to 90° when viewed along the optical axis of the laser beam.

16 Claims, 6 Drawing Sheets

WAVELENGTH CONVERSION METHOD, WAVELENGTH CONVERSION LASER, AND LASER BEAM MACHINING APPARATUS

BACKGROUND OF THE INVENTION

1. Field of the Invention

The present invention relates to a laser beam to wave length conversion through use of a nonlinear optical crystal, and more particularly, to a technique for processing a workpiece by emitting a wavelength-converted laser beam on the workpiece.

2. Description of the Related Art

In a wavelength conversion laser of JP-A-5-142607 (pp. 3 to 4, and FIG. 1), when two nonlinear optical crystals are arranged in series with each other, the nonlinear optical crystals are the to be identical in length in a direction in which a laser beam passes through the crystals. One of the nonlinear optical crystals is aligned with an incident laser beam in terms of a crystal orientation axis for phase matching. After having passed through a first nonlinear optical crystal, the incident laser beam enters a second nonlinear optical crystal. Here, the second nonlinear optical crystal is arranged at a position where the crystal orientation axis of the second crystal for phase matching is offset from that of the first crystal by an angle of less than a full width half maximum of a phase matching angle. The offset angle of the crystal axis (crystal orientation axis) of the nonlinear optical crystal is as small as several microradians to tens of microradians (see, e.g., JP-A-5-142607). Specifically, two nonlinear optical crystals, which are identical in length with reference to a direction in which the laser beam passes through the crystals, are arranged such that the crystal orientation axes of the nonlinear optical crystals are directed in substantially the same direction when viewed from the direction of the optical axis of the laser beam.

In a wavelength conversion laser of JP-A-6-110098. (pp. 3 to 4, and FIG. 2), KN crystals, which are nonlinear optical crystals, each have a thickness of 0.5 mm. When the two KN crystals are arranged while cut angles θ of the crystals are changed from each other, orientations of crystallographic axes (crystal orientation axes) of the crystals are arranged so as to compensate for a walking angle (see, e.g., JP-A-6-110098). Specifically, two nonlinear optical crystals, which are identical in length with reference to a direction in which a laser beam passes through the crystals, are arranged such that crystal orientation axes of the respective nonlinear optical crystals are rotated substantially through 180° around the optical axis of the laser beam when viewed from the direction of the optical axis.

A wavelength conversion laser of JP-A-4-330425 (pg. 3, and FIG. 1) uses two identical crystals of nonlinear optical crystalline material. When the crystals are made equal in length to each other, the crystals are arranged such that the mutually-equivalent optical axes of the crystals are offset from each other by 90° (see, e.g., JP-A-4-330425).

In the wavelength conversion laser beams of the JP-A-5-142607 and JP-A-6-110098, the two nonlinear optical crystals that are identical in length with reference to the direction in which the laser beam passes through the crystals are arranged such that the crystal orientation axes of the respective nonlinear optical crystals are orientated in substantially the same direction when viewed from the direction of optical axis of the laser beam. Alternatively, the two nonlinear optical crystals are arranged such that the crystal orientation axes of the respective nonlinear optical crystals are rotated about 180° around the optical axis. Consequently, the polarizing directions of the wavelength-converted laser beams emitted from the two nonlinear optical crystals are aligned in the same direction; namely, the laser beams are output as linearly-polarized wavelength-converted laser beams. Therefore, the wavelength-converted laser-beams emitted from the two nonlinear optical crystals cause interference. Now, the refractive index of a gas, such as air, present between the two nonlinear optical crystals or the refractive indices of antireflection coatings (AR coatings) provided on the end faces of the two nonlinear optical crystals are susceptible to wavelength dispersion. Conditions for occurrence of interference between the wavelength-converted laser beams emitted from the nonlinear optical crystals change according to a distance between the two nonlinear optical crystals. If two nonlinear optical crystals fail to be spaced at a specific interval, generation of a high-output wavelength-converted laser beam is impossible. Since the refractive index of the air existing between the two nonlinear optical crystals or the refractive index of the antireflection coating changes according to a temperature, conditions for interference vary according to temperatures, and hence there arises a problem of resultantly-generated wavelength-converted laser beams becoming very unstable.

The wavelength conversion laser according to the JP-A-4-330425 has a configuration for effecting wavelength conversion within a resonator for generating a fundamental laser beam. The laser beam enters a nonlinear optical crystal while traveling back and forth within the resonator. In order to cancel an offset between the fundamental laser beams emitted every time the laser beam passes through the nonlinear optical crystals, there has been a necessity for making the two nonlinear optical crystals strictly identical in length with respect to the direction in which the laser beam passes. Therefore, when the nonlinear optical crystals are exchanged, there arises a necessity for preparing and exchanging a nonlinear optical crystal strictly identical in length with the original nonlinear optical crystal or preparing and exchanging two nonlinear optical crystals strictly identical in length. This raises a problem of a hike in maintenance costs and a problem of an increase in the time to exchange and adjust the nonlinear optical crystals.

Under an existing laser processing method; for instance, a method for improving the quality of a film by exposing amorphous silicon to a laser beam, a double waveform of a Q-switch YAG laser is radiated on amorphous silicon (see, e.g., JP-A-63-314862 (pg. 2, FIGS. 1, 3).

Under another existing laser processing method; for instance, a method for crystallizing amorphous silicon by exposing amorphous silicon to a laser beam, a laser beam is radiated while a fundamental wave, a second harmonic, a third harmonic, or a fourth harmonic of a YAG laser is modified such that the profile of an exposed surface becomes linear during the course of exposure (see, e.g., JP-A-2001-144027 (pp. 4 to 5, FIG. 2)).

According to the related-art laser processing method, when a wavelength-converted laser beam originating from a wavelength conversion laser equipped with a wavelength converter is used for exposure, a wavelength-converted laser emitted from the wavelength conversion laser (i.e., the wavelength converter) is usually linearly-polarized, which raises a problem of occurrence of a difference in processing results depending on a processing direction and a polarizing direction. Particularly, in the case of processing operation for realizing polysilicon by radiating a laser beam on amorphous silicon and annealing the thus-exposed silicon, when a device, such as a thin-film transistor, is fabricated through use of a substrate that has been transformed into polysilicon by a conventional laser processing method, there is a problem of a difference arising in characteristics depending on a relationship between the scanning direction and polarizing direction of the laser beam.

SUMMARY OF THE INVENTION

The present invention has been conceived to solve the drawbacks of the related-art wavelength conversion laser and aims at providing a wave length conversion method and a wavelength conversion laser, which enable highly-efficient, stable generation of a high-output wavelength-converted laser beam by readily preventing occurrence of interference between laser beams wavelength-converted by two nonlinear optical crystals, without strictly controlling lengths of the two nonlinear optical crystals in a direction in which the laser beam passes through the optical crystals.

The present invention aims at providing a laser processing apparatus capable of accurately effecting uniform and uniform processing over a long period of time.

A wavelength conversion method of the invention is directed toward a method for subjecting a fundamental laser beam to wavelength conversion through use of nonlinear optical crystals for wavelength conversion purpose, by causing the fundamental laser beam to travel in one direction, the method comprising: causing a randomly-polarized fundamental laser beam to sequentially pass through two nonlinear optical crystals for wavelength conversion purposes arranged in tandem, to thereby generate a wavelength-converted laser beam including wavelength-converted beams whose polarizing directions differ from each other by 45° to 90°.

A wavelength conversion laser according to the invention is directed toward a device for subjecting a fundamental laser beam to wavelength conversion through use of nonlinear optical crystals for wavelength conversion purpose, by causing the fundamental laser beam to travel in one direction, the laser comprising: a fundamental laser light source for generating a randomly-polarized fundamental laser beam; and two nonlinear optical crystals which are arranged in series with each other such that crystal orientation axes of the crystals differ by 45° to 90° when viewed with respect to a direction of an optical axis of the laser beam, wherein the randomly-polarized fundamental laser beam is caused to sequentially pass through the two nonlinear optical crystals, to thereby generate a wavelength-converted laser beam including wavelength-converted laser beams whose polarizing directions differ from each other by 45° to 90°.

A wavelength conversion laser according to the invention is directed toward a means for subjecting a fundamental laser beam to wavelength conversion through use of nonlinear optical crystals for wavelength conversion purpose, by causing the fundamental laser beam to travel in one direction, the laser comprising: a fundamental laser light source for generating a randomly-polarized fundamental laser beam; two nonlinear optical crystals which are arranged in series with each other such that crystal orientation axes of the crystals are aligned in the same direction or in opposite directions of about 180° when viewed with respect to a direction of an optical axis of the laser beam; and polarizing direction rotation device which is disposed between the two nonlinear optical crystals and which rotates a polarizing direction of the wavelength-converted laser beam by 45° to 90°, wherein the randomly-polarized fundamental laser beam is caused to sequentially pass through the two nonlinear optical crystals, to thereby generate a wavelength-converted laser beam including wavelength-converted laser beams whose polarizing directions differ from each other by 45° to 90°.

A laser processing apparatus according to the invention is directed toward exposure of a workpiece to a laser beam which has been wavelength-converted by the above-described wavelength conversion laser.

According to the invention, there is provided a method for subjecting a fundamental laser beam to wavelength conversion through use of nonlinear optical crystals for wavelength conversion purpose, by causing the fundamental laser beam to travel in one direction, the method comprising: causing a randomly-polarized fundamental laser beam to sequentially pass through two nonlinear optical crystals for wavelength conversion purposes arranged in tandem, to thereby generate a wavelength-converted laser beam including wavelength-converted laser beams whose polarizing directions differ from each other by 45° to 90°. Therefore, there is readily prevented occurrence of interference, which would otherwise arise between laser beams which have been wavelength-converted by nonlinear optical crystals, without strict adjustment of the lengths of the two nonlinear optical crystals with respect to a direction in which the laser beam passes. There is yielded an advantage of the ability to stably output a high-output wavelength-converted laser beam in a highly efficient manner.

Further, the present invention provides a means for subjecting a fundamental laser beam to wavelength conversion through use of nonlinear optical crystals for wavelength conversion purpose, by causing the fundamental laser beam to travel in one direction, the laser comprising: a fundamental laser light source for generating a randomly-polarized fundamental laser beam; and two nonlinear optical crystals which are arranged in series with each other such that crystal orientation axes of the crystals differ by 45° to 90° when viewed with respect to a direction of an optical axis of the laser beam, wherein the randomly-polarized fundamental laser beam is caused to sequentially pass through the two nonlinear optical crystals, to thereby generate a wavelength-converted laser beam including wavelength-converted laser beams whose polarizing directions differ from each other by 45° to 90°. Therefore, there is readily prevented occurrence of interference, which would otherwise arise between laser beams which have been wavelength-converted by nonlinear optical crystals, without strict adjustment of the lengths of the two nonlinear optical crystals with respect to a direction in which the laser beam passes. There is yielded an advantage of the ability to stably output a high-output wavelength-converted laser beam in a highly efficient manner.

The present invention also provides a means for subjecting a fundamental laser beam to wavelength conversion through use of nonlinear optical crystals for wavelength conversion purpose, by causing the fundamental laser beam to travel in one direction, the laser comprising: a fundamental laser light source for generating a randomly-polarized fundamental laser beam; two nonlinear optical crystals which are arranged in series with each other such that crystal orientation axes of the crystals are aligned in the same direction or in opposite directions of about 180° when viewed with respect to a direction of an optical axis of the laser beam; and polarizing direction rotation device which is disposed between the two nonlinear optical crystals and which rotates a polarizing direction of the wavelength-converted laser beam by 45° to 90°, wherein the randomly-polarized fundamental laser beam is caused to sequentially pass through the two nonlinear optical crystals, to thereby generate a wavelength-converted laser beam including wavelength-converted laser beams whose polarizing directions differ from each other by 45° to 90°. Therefore, there is readily prevented occurrence of interference, which would otherwise arise between laser beams which have been wavelength-converted by nonlinear optical crystals, without strict adjustment of the lengths of the two nonlinear optical crystals with respect to a direction in which the laser beam passes. There is yielded an advantage of the ability to stably output a high-output wavelength-converted laser beam in a highly efficient manner.

The present invention also enables exposure of a workpiece to a laser beam which has been wavelength-converted by the above-described wavelength conversion laser. There is yielded an advantage of the ability to perform homogenous and uniform processing in a stable, accurate, and efficient manner.

DESCRIPTION OF THE PREFERRED EMBODIMENTS

First Embodiment

Figure 1:
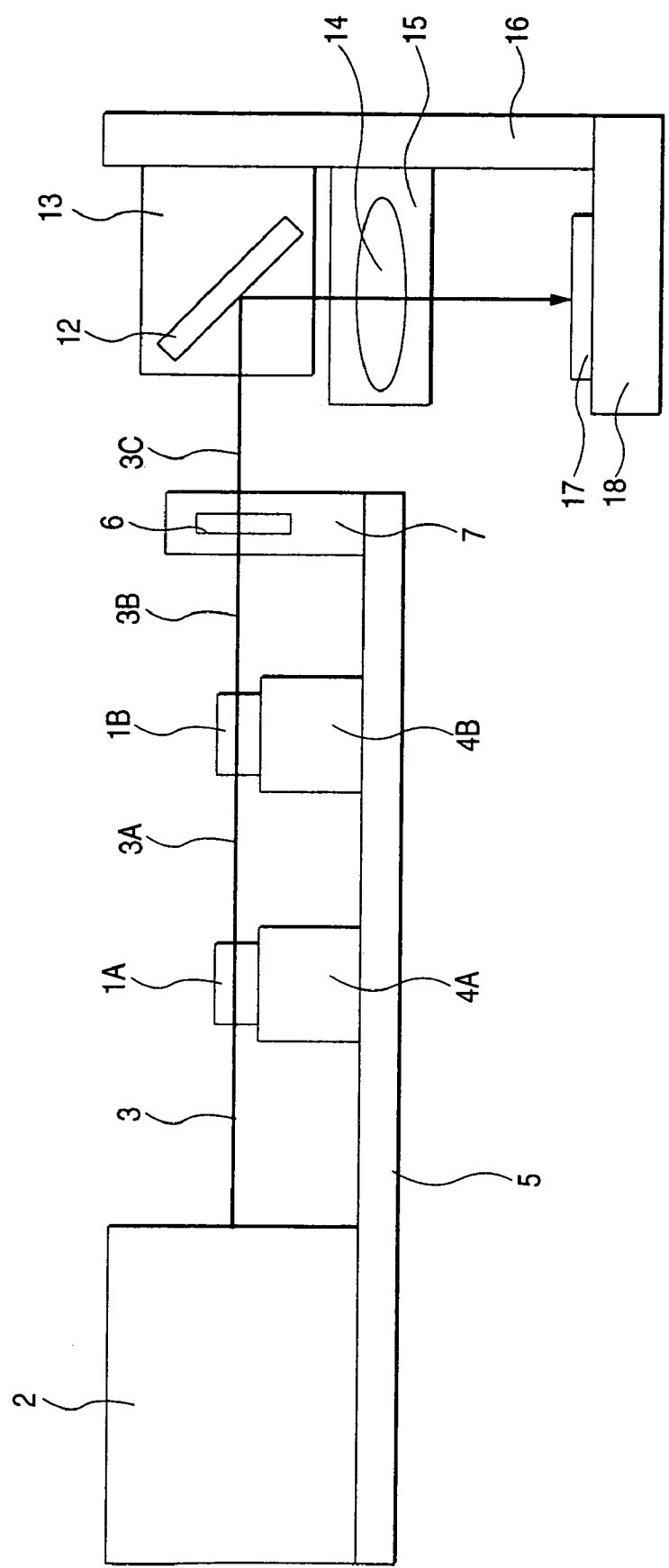
FIG. 1 is a view for describing a wavelength conversion method, a wavelength conversion laser, and a laser processing apparatus according to a first embodiment of the invention.
Figure 2A:
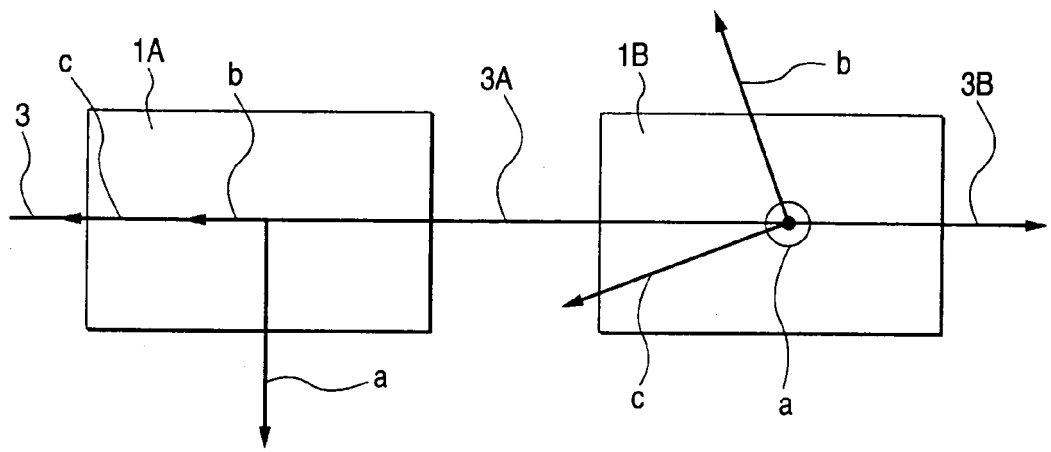
FIG. 2A is a top view for describing a wavelength conversion method, a wavelength conversion laser, and a laser processing apparatus according to the first embodiment of the invention.
Figure 2B:
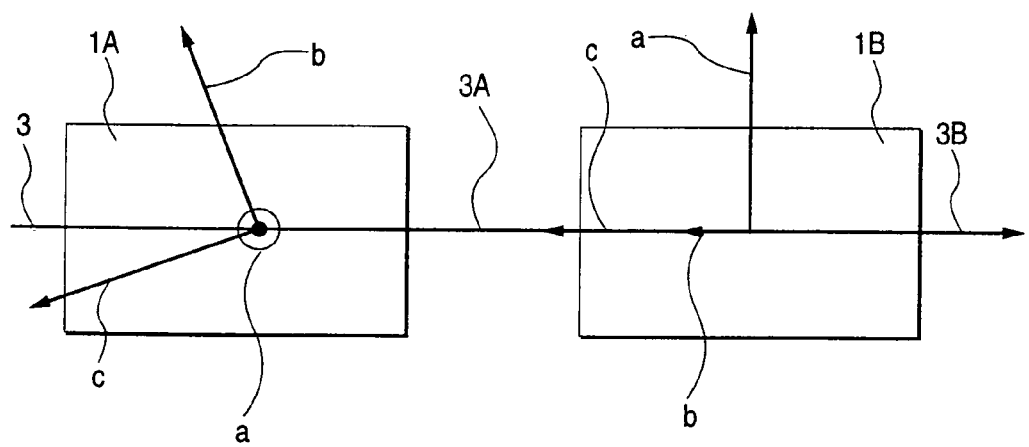
FIG. 2B is a side view for describing a wavelength conversion method, a wavelength conversion laser, and a laser processing apparatus according to the first embodiment of the invention.
Figure 2C:
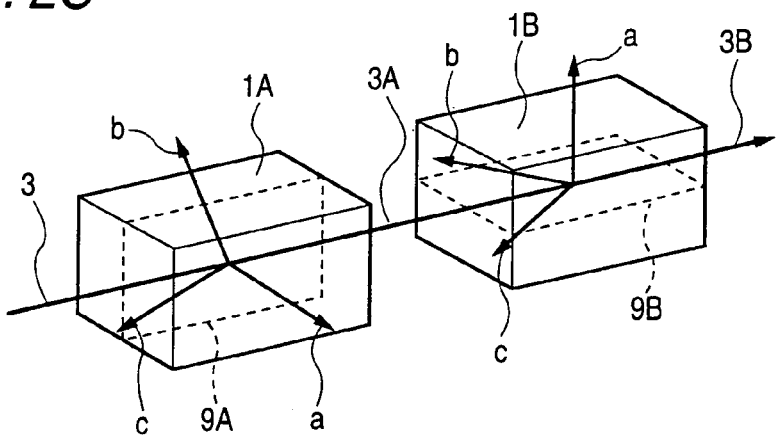
FIG. 2C is a perspective view for describing a wavelength conversion method, a wavelength conversion laser, and a laser processing apparatus according to the first embodiment of the invention.
Figure 3:
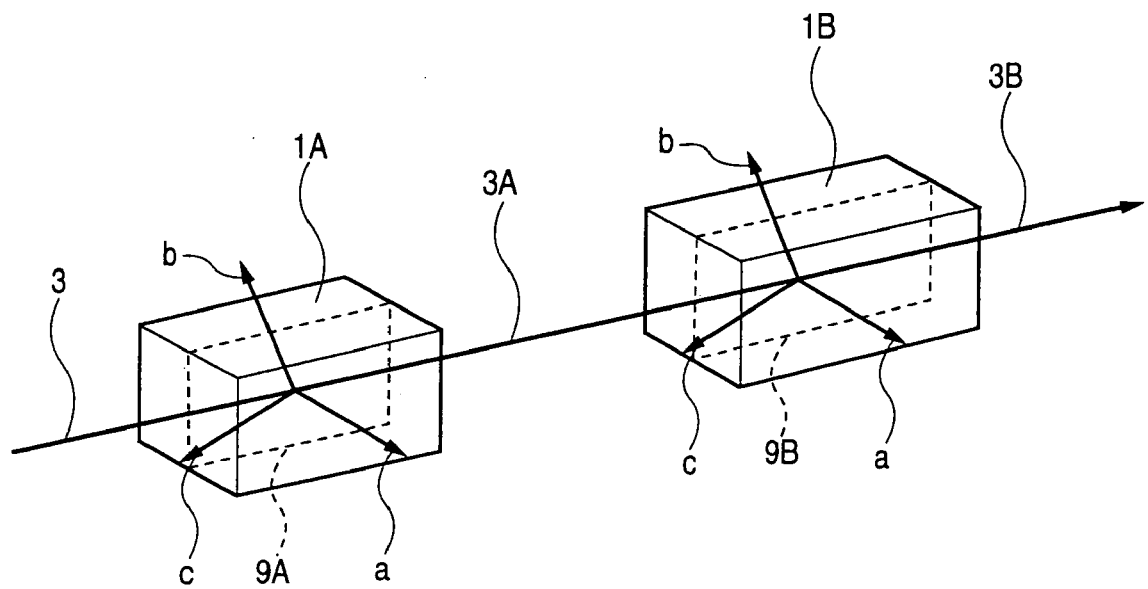
FIG. 3 is a view for describing a wavelength conversion method, a wavelength conversion laser, and a laser processing apparatus according to the first embodiment of the invention.

FIGS. 1 through 3 are views for describing a wavelength conversion method, a wavelength conversion laser, and a laser processing apparatus according to a first embodiment of the present invention. FIG. 1 is a side view showing a laser processing apparatus. FIG. 2A is an enlarged top view of the laser processing apparatus; FIG. 2B is an enlarged side view of the laser processing apparatus, and FIG. 2C is an enlarged perspective view of the laser processing apparatus. FIG. 3 is a perspective view showing nonlinear optical crystals for wavelength conversion, which are the principal sections of a laser processing apparatus used for a comparison test.

In FIG. 1, the laser processing apparatus includes a wavelength converter and a laser radiation device. The wavelength converter includes a fundamental laser light source (hereinafter often called simply as a "laser light source") 2 for generating a randomly-polarized fundamental laser beam 3; and two nonlinear optical crystals for wavelength conversion purposes arranged in series (hereinafter often called "wavelength conversion crystals") 1A and 1B. The fundamental laser beam 3 is subjected to wavelength conversion by passing through the two nonlinear optical crystals 1A and 1B such that polarizing directions differ from each other by 90°. The laser radiation device radiates, onto a workpiece 17, a laser beam 3C that has been wavelength-converted by the wavelength converter. The wavelength converter 3C includes wavelength-converted laser beams whose polarized directions differ by about 90°.

The wavelength converter is equipped with the wavelength conversion crystals 1A and 1B, and a separation mirror 6 which reflects the fundamental laser beam 3 and permits transmission of the wavelength-converted laser beam 3C. The wavelength converters 1A, 1B are arranged on respective thermo regulators 4A, 4B so as to be in series with reference to the optical axis of a laser light source 2. The separation mirror 6 is arranged in a mirror holder 7.

The laser light source 2 and the wavelength converter constitute a wavelength conversion laser, and the laser light source 2, the thermoregulators 4A, 4B, and the mirror holder 7 are arranged on a common base 5.

The laser radiation device has a reflection mirror 12, a light-gathering optical system 14, and a workbench 18. The reflection mirror 12 held by a mirror holding tool 13 and the light-gathering optical system 14 held by an optical system holding tool 15 are held by a fixing jig 16, and the fixing jig 16 is fastened to the workbench 18. The workpiece 17, such as silicon, a metal plate, ceramics, a printed board, and a green sheet, is held on the workbench 18.

The laser light source 2 has, e.g., Nd(neodymium):YAG, as an active medium and generates the randomly-polarized fundamental laser beam 3 having a wavelength of 1064 nm. The word "randomly-polarized" employed herein signifies a polarized state in which a polarizing direction is not single, as contrasted with the case of linearly-polarized light, and includes a polarized state comprising a plurality of polarizing directional components or a non-polarized state.

The wavelength conversion crystals 1A and 1B are formed from nonlinear optical crystals, e.g., lithium borate (a chemical formula: $LiB_3O_5$, abbreviated as: LBO).

Referring to FIG. 1, operation of the wavelength conversion laser (i.e., the wavelength converter) will first be described. The fundamental laser beam 3 that has been emitted from the laser light source 2 and acts as a fundamental waveform for waveform conversion enters the wavelength conversion crystal 1A disposed at a first stage, and a portion of the laser beam 3 is converted into a harmonic through wavelength conversion, to thus produce a fundamental wave/harmonic mixed laser beam 3A. The fundamental wave/harmonic mixed laser beam 3A again enters a wavelength conversion crystal 1B disposed at a second stage, and a portion of the fundamental waveform component of the laser beam 3A is converted into a harmonic through wavelength conversion, to thus produce a fundamental wave/harmonic mixed laser beam 3B. The fundamental wave/harmonic mixed laser beam 3B enters the separation mirror 6, and the fundamental waveform component of the laser beam 3B is reflected to enter an unillustrated damper or the like. Only a harmonic component of the laser beam 3B passes through the separation mirror 6, and the thus-passed harmonic component is extracted outside of the wavelength conversion laser (the wavelength converter) as the wavelength-converted laser beam 3C.

As mentioned above, the wavelength conversion laser of the embodiment converts causes the fundamental laser beam to travel in one direction, whereupon the laser beam is wavelength-converted by the non-linear optical crystals for wavelength conversion purpose (i.e., the wavelength conversion crystals 1A, 1B).

Referring to FIG. 2A to 2C, a method for arranging the wavelength conversion crystals 1A, 1B will be described in detail. Here, there is described a case where an Nd(neodymium):YAG laser which emits the fundamental laser beam 3 at a wavelength of 1064 nm in a randomly-polarized state is used as the laser light source 2; and a lithium borate (a chemical formula: $LiB_3O_5$, abbreviated as: LBO) crystal which converts a portion of the fundamental laser beam 3 to a second harmonic of 532 nm through type-2 phase matching is used for the wavelength conversion crystals 1A, 1B.

In this case, the fundamental laser beam 3 is caused to pass in a direction of about 20.5° with reference to a crystal orientation axis "c" within planes 9A and 9B, both planes being perpendicular to a crystal orientation axis "a" of the lithium borate crystal and being formed from crystal orientation axes "b" and "c," thereby satisfying conditions for type-2 phase matching; that is, a fundamental wave and a second harmonic. As a result, a portion of the randomly-polarized fundamental laser beam 3 is subjected to wavelength conversion; thereby generating a linearly-polarized second harmonic in the direction of the crystal orientation axis "a."

In the present embodiment, the wavelength conversion crystal 1A, which is disposed at a first stage and through which a fundamental waveform laser beam first passes at the first stage, and the wavelength conversion crystal 1B, which is disposed at a second stage and through which a fundamental waveform laser beam passes at the second stage, differ in length with respect to the direction in which the laser beam passes through the wavelength conversion crystals; that is, the wavelength conversion crystal 1B disposed at the second stage is longer than the wavelength conversion crystal 1A disposed at the first stage.

Moreover, the wavelength conversion crystal 1A is arranged such that the crystal orientation axis "a" is directed toward a horizontal direction (i.e., a direction perpendicular to the sheet of FIG. 1), and the wavelength conversion crystal 1B is arranged such that the crystal orientation axis "a" is directed toward a vertical direction (i.e., a direction parallel to the sheet of FIG. 1). As mentioned above, when the two wavelength conversion crystals 1A, 1B are arranged in series with each other, the crystal orientation axis of the wavelength conversion crystal 1B is rotated about the optical axis of the laser beam 3 by 90° with respect to that of the remaining wavelength conversion crystal 1A (specifically, the crystal orientation axes differ from each other by 90° when viewed in the direction of the optical axis of the laser beam). As a result; the polarizing direction of the second harmonic generated by the wavelength conversion crystal 1A differs from that of the second harmonic generated by the wavelength conversion crystal 1B by 90°. Consequently, there is produced a wavelength-converted laser beam 3C including wavelength-converted laser beams whose polarizing directions differ by about 90°.

Next, laser processing will be described. The wavelength-converted laser beam 3C generated by the wavelength conversion laser (i.e., the wavelength converter) is reflected by the reflection mirror 12 and gathered and radiated on the workpiece 17 by the light-gathering optical system 15, to thus machine the workpiece 17 through annealing, surface reforming, boring, cutting, welding, trimming, or the like.

As mentioned above, in the first embodiment, the polarizing direction of the second harmonic (the wavelength-converted laser beam) generated by the wavelength conversion crystal 1A and the polarizing direction of the second harmonic (i.e., the wavelength-converted laser beam) generated by the wavelength conversion crystal 1B differ from each other by 90°. Regardless of presence/absence of anti-reflection coating or a space between the two wavelength conversion crystals 1A, 1B, interference does not arise between the second harmonics. Therefore, there is yielded an advantage of the ability to generate a high-output wavelength-converted laser beam with, high efficiency, stably, and by simple means.

The above-described wavelength conversion employs a laser light source for originating a randomly-polarized fundamental laser beam. Hence, even when the phase of the fundamental laser beam is shifted by the wavelength conversion crystal 1A disposed at the first stage, wavelength conversion performed by the wavelength conversion crystal 1B disposed in the second stage will not be affected. Wavelength conversion is performed outside a resonator to be used for generating a fundamental laser beam, and hence a phase shift in the fundamental laser beam caused by the two wavelength conversion crystals 1A, 1B does not affect oscillation of the fundamental wave laser beam. Interference between the laser beams that have been wavelength-converted by the wavelength conversion crystals 1A, 1B is prevented in a simple manner without involvement of strict adjustment of the lengths of the two wavelength conversion crystals 1A, 1B (i.e., the nonlinear optical crystals) in the direction in which the laser beam passes through the crystals, thereby enabling highly efficient, stable generation of a high-output wavelength-converted laser beam. Since strict adjustment of the lengths of the two wavelength conversion crystals 1A, 1B in the direction—in which the laser beam passes through the crystals—is not required, there is no necessity for preparing crystals which are strictly identical in length with the original crystals when the wavelength conversion crystals 1A, 1B are replaced, thereby yielding an advantage of the ability to lower maintenance costs. Moreover, preparation of two wavelength conversion crystals 1A, 1B having the same length is not required, and hence there is yielded an advantage of low maintenance costs and the ability to shorten the time required to replace or adjust a crystal.

The power of the fundamental wave component of the fundamental wave/harmonic mixed laser beam 3A entering the wavelength conversion crystal 1B is smaller than that of the fundamental wave laser beam 3 entering the wave length conversion crystal 1A. However, in the first embodiment, the wavelength conversion crystal 1B disposed at the second stage is longer than the wavelength conversion crystal 1A disposed at the first stage, with respect to the direction in which the laser beam passes through the crystals. Therefore, the power of the second harmonic generated by the wavelength conversion crystal 1A disposed at the first stage can be made close to the power of the second harmonic generated by the wavelength conversion crystal 1B disposed at the second stage. Therefore, as will be described in detail hereinbelow, when the wavelength-converted laser beam 3C generated by the wavelength conversion laser of the first embodiment is used as, e.g., a processing light source, there is yielded the advantage of the ability to eliminate the polarizing direction dependency of processing.

Namely, in the first embodiment, the laser processing apparatus is configured as mentioned previously. The wavelength-converted laser beam 3C generated by the wavelength conversion laser (i.e., a wavelength converter) includes a polarizing component of a horizontal direction (i.e., the direction perpendicular to the sheet of FIG. 1) and a polarizing component of a vertical direction (i.e., the direction parallel to the sheet of FIG. 1). The wavelength-converted laser beam assumes a polarized state close to the state of randomly-polarized light. Hence, there is yielded an advantage of the ability to stably perform uniform [i.e., constant regardless of a polarizing direction or processing point (location)] processing without dependence on the polarizing direction. Further, the wavelength conversion laser (wavelength converter) can highly efficiently and stably generate a high-output wavelength-converted laser beam 3C, and hence there is yielded an advantage of the ability to stably effect accurate, uniform processing over a long period of time (i.e., constant in terms of time per operation).

An advantage of the present embodiment will be further described by providing specific test examples (i.e., Example 1 and Comparative Example 1).

EXAMPLE 1

Nd(Neodymium):YAG laser, which performs Q-switching pulse oscillation and generates a fundamental laser beam having a wavelength of 1064 nm, was used as the laser light source 2. Specifications for the laser beam 3 include mean power of 529 W, a pulse cycle frequency of 4 kHz, a pulse width of 40.4 ns, and beam quality $M^2 \approx 10$.

Lithium borate (chemical formula: $LiB_3O_5$) was used as the wavelength conversion crystals 1A, 1B, wherein the lithium borate generates a second harmonic by type-2 phase matching and wherein the crystal have lengths of 15 mm and 18 mm with respect to the direction in which the laser beam passes through the crystals. The crystals were disposed at $1/e^2$ radius of the fundamental laser beam 3; that is, at 0.54 mm and 0.52 mm.

When the crystal orientation axis "a" of the wavelength conversion crystal A was arranged horizontally and the crystal orientation axis "a" of the wavelength conversion crystal 1B was arranged vertically, as shown in FIG. 2, the second harmonic wavelength-converted laser beam 3C produced an output of 186 W. The second harmonic wavelength-converted laser beam was subjected to polarizing separation, and the power of each of resultant polarizing components was measured. The power of the polarizing component stemming from the wavelength conversion crystal 1A was 95 W, and the power of the polarizing component stemming from the wavelength conversion crystal 2A was 91 W. Thus, the two polarizing components had substantially the same power. The wavelength-converted laser beam 3C was in a polarized state close to isotropic. Mean output of the second harmonic wavelength-converted laser beam 3C had fluctuations of about ±1% and was very stable. The wavelength-converted laser beam 3C was radiated on amorphous silicon, to thus transform amorphous silicon to polysilicon. A characteristic of the device was not dependent on the polarizing direction.

COMPARATIVE EXAMPLE 1

A comparative example differs from Example 1 only in the directions of the wavelength conversion crystals 1A, 1B; namely, as shown in FIG. 3, the wavelength conversion crystals 1A, 1B are arranged such that the crystal orientation axes "a" are arranged horizontally. In this case, a mean output of the second harmonic wavelength-converted laser beam 3C was 138 W, which is about 23% lower than that achieved in the Example. Further, the mean output of the second harmonic wavelength-converted laser beam 3C had fluctuations of about ±10% and was very unstable. Moreover, since the directions of the crystal orientation axes of the two wavelength conversion crystals 1A, 1B were aligned, the wavelength-converted laser beam 3C was linearly polarized. The wavelength-converted laser beam 3C was radiated on amorphous silicon, to thus transform the amorphous silicon into polysilicon. A difference exists between characteristics of the devices, with a dependence on a scanning direction and the polarizing direction.

Test results reveal that, when the high-output wavelength-converted laser beam 3C having power of 100 W or more is produced, highly-efficient, stable generation of a high-output wavelength-converted laser beam is enabled as a result of use of the wavelength conversion laser and the wavelength conversion method, both being shown in the first embodiment.

In the example, a nonlinear optical crystal having a length of 15 mm was used for the wavelength conversion crystal 1A, and a nonlinear optical crystal having a length of 18 mm was used for the wavelength conversion crystal 1B. However, the lengths of the crystals are not limited to these lengths. For instance, nonlinear optical crystals having very similar lengths, such as a nonlinear optical crystal having a length of 18.00 mm and a nonlinear optical crystal having a length of 18.01 mm, may be used, in which case a similar advantage is yielded.

The first example has described a case where the crystal orientation axis "a" of the wavelength conversion crystal 1A is arranged horizontally and the crystal orientation axis "a" of the wavelength conversion crystal 1B is arranged vertically. Conversely, the crystal orientation axis "a" of the wavelength conversion crystal 1A may be arranged vertically, and the crystal orientation axis "a" of the wavelength conversion crystal 1B may be arranged horizontally. In short, the only requirement is to arrange the crystals such that the polarizing direction of the wavelength-converted laser beam emitted from the wavelength conversion crystal 1A and that of the wavelength-converted laser beam emitted from the wavelength conversion crystal 1B differ from each other by 90°. So long as this requirement is satisfied, an advantage similar to that described in connection with the first embodiment is yielded.

In the first embodiment, the two wavelength conversion crystals 1A, 1B are arranged such that crystal orientation axes differ from each other by 90° when viewed in the direction of optical axis of the laser beam. Any angle may be adopted, so long as the influence of interference between the wavelength-converted laser beam emitted from the wavelength conversion crystal 1A disposed at the first stage and the wavelength-converted laser beam emitted from the wavelength conversion crystal 1B disposed at the second stage becomes small. Hence, the polarizing directions do not need to differ from each other by precisely 90°. The only requirement is that the crystal orientation axes of the two wavelength conversion crystals 1A, 1B and the polarizing directions of the wavelength-converted laser beam 3C differ from each other within a range of 45° to 90°. Desirably, a difference is about 90° [for instance, within a range of 85° to 90° (a drop in output due to the influence of interference becomes 10% or less), more preferably within a range of 88° to 90° (a drop in output due to the influence of interference becomes 5% or less)].

In the invention, when a smaller one of angles defined between the crystal orientation axes of the two wavelength conversion crystals 1A, 1B is 45°, the crystal orientation axes of the two wavelength conversion crystals 1A, 1B are the to differ from each other by 45°. When a smaller one of the angles defined between the polarizing directions of the laser beams that have been wavelength-converted by the two wavelength conversion crystals 1A, 1B is 45°, the polarizing directions are the to differ from each other by 45°.

Second Embodiment

Figure 4:
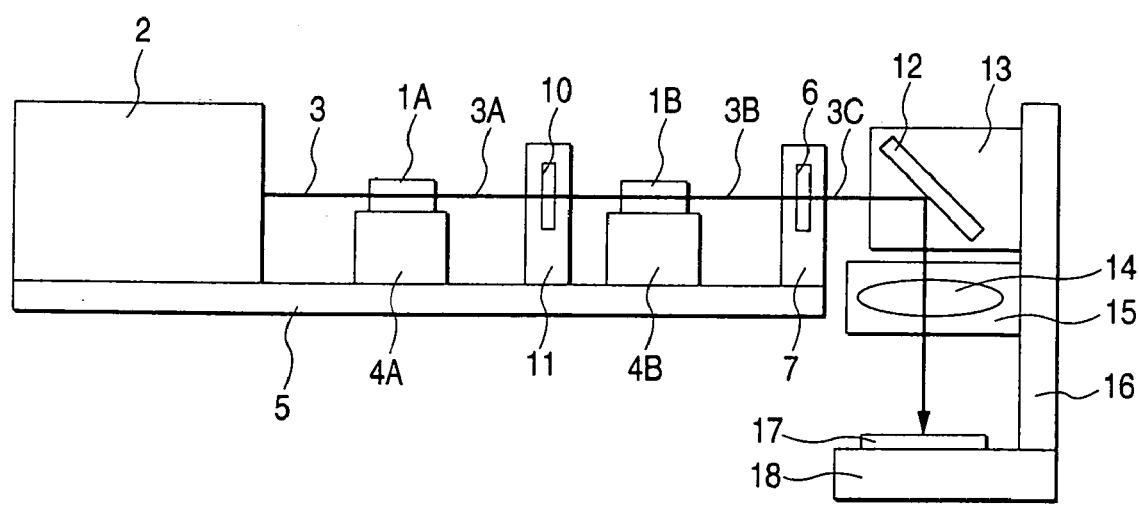
FIG. 4 is a view for describing a wavelength conversion method, a wavelength conversion laser, and a laser processing apparatus according to a second embodiment of the invention.
Figure 5:
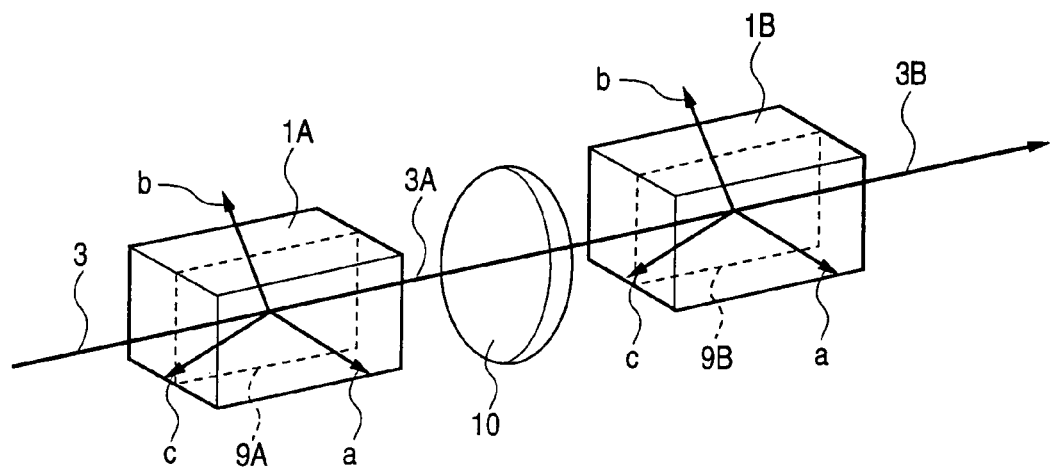
FIG. 5 is a view for describing a wavelength conversion method, a wavelength conversion laser, and a laser processing apparatus according to the second embodiment of the invention.

FIGS. 4 and 5 are views for describing a wavelength conversion method, a wavelength conversion laser, and a laser processing apparatus according to a second embodiment. More specifically, FIG. 4 is a side view of a laser processing apparatus, and FIG. 5 is a perspective view showing the wavelength conversion crystals and the wavelength plate, both being shown in FIG. 4, in an enlarged manner.

In the embodiment, the two wavelength conversion crystals 1A, 1B are arranged in series with each other such that the crystal orientation axes "a" of the crystals are aligned in a single direction when viewed in the direction of the optical axis of the laser beam. A wavelength plate 10 is disposed between the two nonlinear optical crystals 1A and 1B as polarizing direction rotation device for rotating the polarizing direction of a wavelength-converted laser beam through 90°. In other respects, the embodiment is identical with the first embodiment, and hence the following descriptions pertain to primarily a difference between the first and second embodiments.

In the wavelength conversion laser shown in FIG. 4, the wavelength plate 10 for rotating the polarizing direction of the harmonic component of the fundamental wave/harmonic mixed laser beam 3A through 90° about the optical axis is held by a holder 11. The holder 11 is provided on the base 5 interposed between the wavelength conversion crystals 1A and 1B. The wavelength plate 10 is formed from, e.g., a half wavelength plate, and the crystal orientation axis of the wavelength plate 10 is rotated through 45° about the optical axis of the laser beam 3 with reference to the crystal orientation axes "a" of the wavelength conversion crystals 1A, 1B.

FIG. 5 shows a case where an Nd(Neodymium):YAG laser, which generates the fundamental laser beam 3 having a wavelength of 1064 nm through random polarization, is used as the laser light source 2; and where lithium borate. (chemical formula: $Li_3O_3$, abbreviated LBO), which wavelength-converts a portion of the fundamental laser beam 3 into a second harmonic having a wavelength of 532 nm through type-2 phase matching, is used as the wavelength conversion crystals 1A, 1B. The wavelength conversion crystals 1A, 1B are arranged such that the crystal orientation axes "a" are arranged horizontally (i.e., a direction perpendicular to the sheet of FIG. 4).

In the wavelength conversion laser having the foregoing structure, the fundamental wave/harmonic mixed laser beam 3A enters the wavelength conversion crystal 1B while the polarizing direction of the harmonic component of the laser beam 3A is rotated through 90° around the optical axis by the half wavelength plate 10. Hence, the polarizing direction of the second harmonic, which is generated by the wavelength conversion crystal 1A and enters the wavelength conversion crystal 1B, and the polarizing direction of the second harmonic wave generated by the wavelength conversion crystal 1B differ from each other by 90°. Specifically, a laser beam wavelength-converted laser beam including wavelength-converted laser beams whose polarizing directions differ from each other by about 90° is generated as the wavelength-converted laser beam 3C.

Therefore, the second embodiment also yields the same advantage as that yielded by the first embodiment.

As in the case of the first embodiment, the wavelength conversion laser of the embodiment also causes the fundamental laser beam to travel in one direction and subjects the laser beam to wavelength conversion by the nonlinear optical crystals for wavelength conversion purposes (i.e., the wavelength conversion crystals 1A, 1B).

The second embodiment has shown the configuration of the wavelength conversion laser that adopts the half wavelength plate 10 as polarizing direction rotation device for rotating the polarizing direction of the wavelength-converted laser beam through about 90°. However, an optical rotating plate or an electro-optical element may be employed in lieu of the half wavelength plate 10, in which case a similar advantage is yielded.

The second embodiment has shown the configuration in which the crystal orientation axes of the two wavelength conversion crystals 1A, 1B are aligned in a single direction when viewed from the direction of the optical axis of the laser beam. However, the two wavelength conversion crystals may be arranged in opposite directions; i.e. with a difference of 180°, in which case an advantage analogous to that yielded by the second embodiment is yielded.

Any angle is sufficient as the angle formed between the crystal orientation axes of the wavelength conversion crystals 1A, 1B, so long as the influence of interference between the wavelength-converted laser beam generated by the wavelength conversion crystal 1A disposed at a first stage and the wavelength-converted laser beam generated by the wavelength conversion crystal 1B disposed at a second stage becomes smaller at that angle. The crystal orientation axes of the wavelength conversion crystals do not need to be accurately aligned in one direction or oriented in precisely opposite directions of 180°. The crystal orientation axes maybe aligned substantially in one direction or oriented in substantially opposite directions of about 180°. For instance, an offset of 5° or less from a single direction or from opposite directions of 180° or, desirably, an offset of 2° or less, is allowable.

The same also applies to the polarizing direction rotation device. The polarizing direction rotation device does not need to be rotated precisely through 90°, and rotation of the rotation device within a range of 45° to 90° is desirable. Desirably, a difference of about 90° (e.g., a difference falling within a range of 85° to 90°, more preferably, a range of 88° to 90°) is sufficient.

In short, as in the case of the first embodiment, the only requirement is that the polarizing direction of the wavelength-converted laser beam, which is generated by the wavelength conversion crystal 1A and enters the wavelength conversion crystal 1B, should differ, within a range of 45° to 90°, from the polarizing direction of the wavelength-converted laser beam generated by the wavelength conversion crystal 1B. Desirably, a difference of about 90° (e.g., a difference falling within a range of 85° to 90°, more preferably, a range of 88° to 90°) is sufficient.

Third Embodiment

Figure 6:
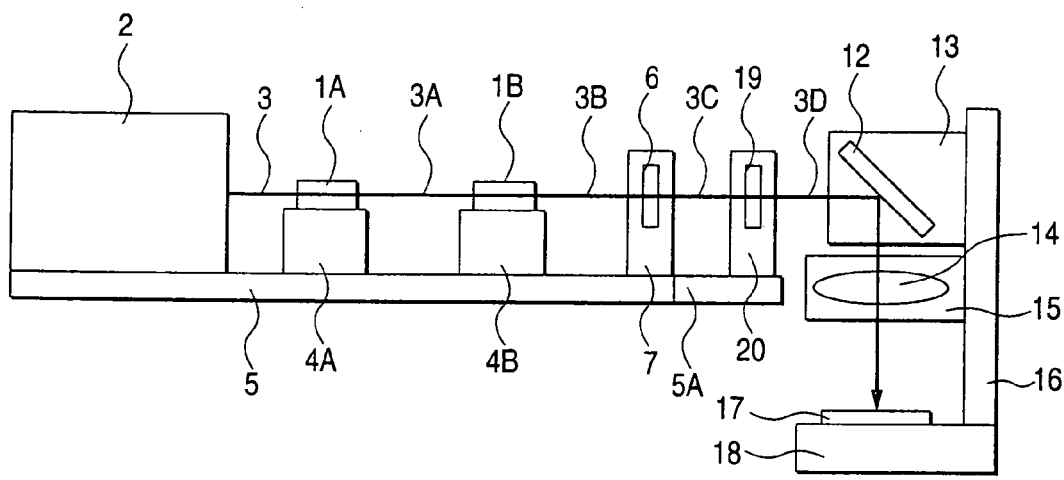
FIG. 6 is a view for describing a wavelength conversion method, a wavelength conversion laser, and a laser processing apparatus according to a third embodiment of the invention.

FIG. 6 is a view for describing a wavelength conversion method, a wavelength conversion laser, and a laser processing apparatus according to a third embodiment. More specifically, FIG. 6 is a side view of a laser processing apparatus.

In the present embodiment, the apparatus has a quarter wavelength plate 19 serving as circular polarizing device for transforming the wavelength-converted laser beam 3C into circular-polarized light. In other respects, the present embodiment is identical in configuration with the first embodiment, and hence the descriptions given hereinbelow pertain primarily to a difference between the present embodiment and the first embodiment.

The quarter wavelength plate 19 is fastened to a holder 20, which is disposed on top of a base 5A, and the base 5A is further secured on the base 5. In FIG. 6, the base 5A is configured as being separate from the base 5, but they may be configured integrally.

In the laser processing apparatus having the foregoing configuration, the wavelength-converted laser beam 3C having passed through the separation mirror 6 is converted into circularly-polarized light by the quarter wavelength plate 19, to thus generate a circularly-polarized wavelength-converted laser beam 3D. Specifically, for instance, in a case where a component stemming from the wavelength-converted laser beam 3C emitted from the wavelength conversion crystal 1A is taken as light circularly polarized clockwise by the quarter wavelength plate 19, a component stemming from the wavelength-converted laser beam 3C emitted from the wavelength conversion crystal 1B becomes light circularly polarized counterclockwise by the quarter wavelength plate 19. Thus, there is yielded a wavelength-converted laser beam 3D including a mixture comprising the counterclockwise-circularly-polarized light and the clockwise-circularly-polarized light. The circularly-polarized, wavelength-converted laser beam 3D is reflected from a reflection mirror 12, and the thus-reflected light is gathered and radiated on the workpiece 17 by the light-gathering optical system 14, whereby the workpiece is subjected to annealing, surface reforming, boring, cutting, welding, trimming, or the like.

As mentioned above, in the third embodiment, the laser processing apparatus has the quarter wavelength plate 19 serving as circular polarizing device for converting the wavelength-converted laser beam 3C into circularly-polarized light. Hence, in addition to the advantage of the first embodiment, the circularly-polarized, wavelength-converted laser beam 3D is gathered and radiated on the workpiece 17, and hence there is yielded an advantage of the ability to stably effect more homogenous processing without dependence on a polarizing direction.

FIG. 6 shows a case where the quarter wavelength plate 19 is inserted into the wavelength conversion laser (the wavelength converter) of the first embodiment. However, a quarter wavelength plate 19 may be inserted into the wavelength conversion laser (the wavelength converter) of the second embodiment.

The circularly polarizing device for converting the wavelength-converted laser beam into circularly-polarized light is not limited to the quarter wavelength plate 19 but may be, e.g., an electro-optical element.

Fourth Embodiment

Figure 7:
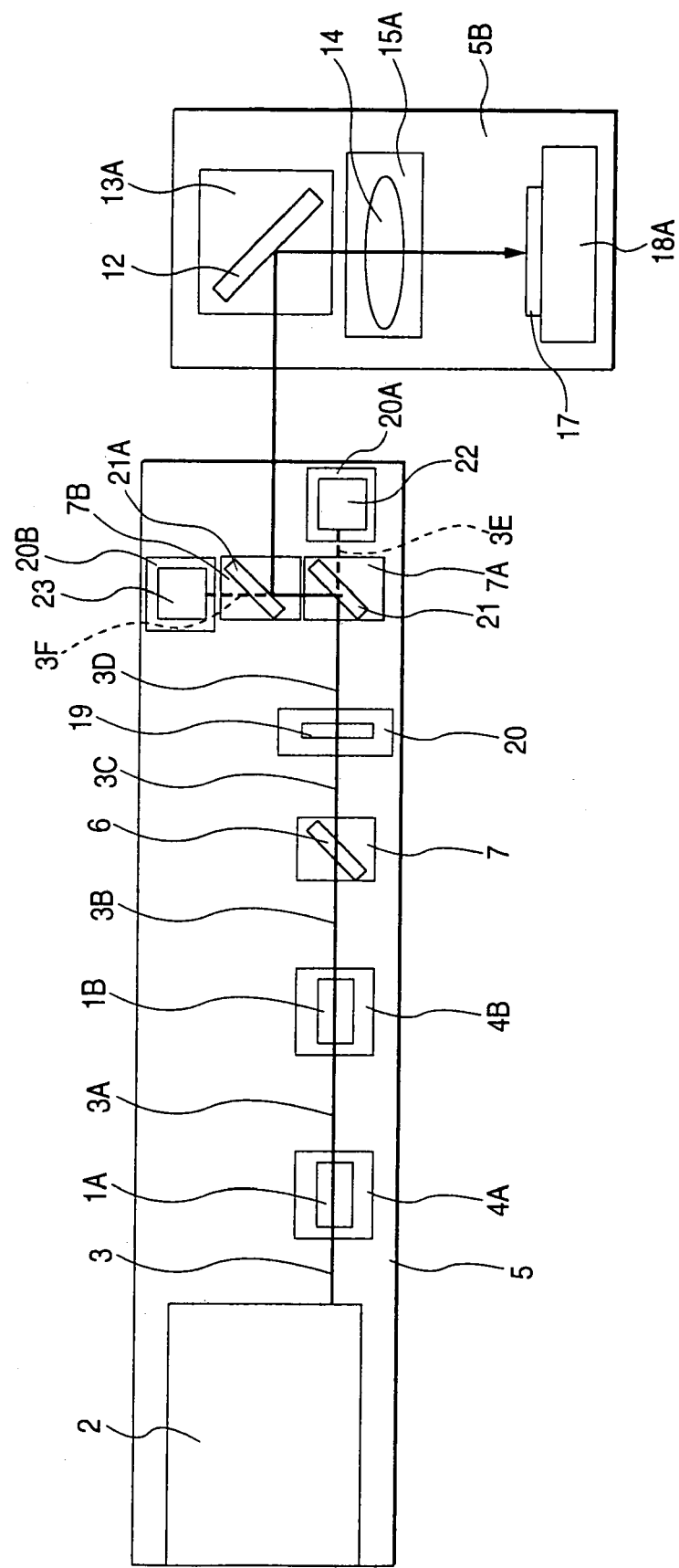
FIG. 7 is a view for describing a wavelength conversion method, a wavelength conversion laser, and a laser processing apparatus according to a fourth embodiment of the invention.

FIG. 7 is a view for describing a wavelength conversion method, a wavelength conversion laser, and a laser processing apparatus according to a fourth embodiment of the invention; more particularly, FIG. 7 is a top view of a laser processing apparatus.

In addition to having the elements of the wavelength conversion laser (i.e., the laser processing apparatus) described in connection with the first embodiment, the laser processing apparatus of the embodiment primarily has the following elements:

First, the laser processing apparatus is provided with reflection mirrors 21, 21A serving as reflection means for permitting passage of a portion of the wavelength conversion laser beam 3D.

Further, the laser processing apparatus is provided with a power monitor 22 for monitoring power and a beam profiler 23 for monitoring a beam profile. Here, the power-monitor 22 serves as a beam monitor which is means for monitoring beam parameters [power, a beam profile (beam size), beam quality, and an angle of divergence] of wavelength conversion laser beams 3E, 3F having passed through the reflection mirrors 21, 21A.

The laser processing apparatus is also provided with the quarter wavelength plate 19 serving as polarization status conversion means. The polarization status conversion device is disposed at a stage before the reflection device (the reflection mirrors 21, 21A) and converts the polarization status of the wavelength conversion laser beam 3C such that the wavelength-converted laser beams generated by the respective nonlinear optical crystals 1A, 1B become substantially equal in terms of ratio between an "s" polarized light component and a "p" polarized light component, with reference to the reflection surface of the reflection device. Specifically, the polarization status conversion device performs converting operation such that the ratio between the "s" polarized light component and the "p" polarized light component in the wavelength-converted laser beam, with reference to the reflection surface of the reflection device, generated by the nonlinear optical crystal 1A through which the fundamental laser beam passes first substantially becomes equal to the ratio between the "s" polarized light component and the "p" polarized light component in the wavelength-converted laser beam, with reference to the reflection surface of the reflection device, generated by the nonlinear optical crystal 1B through which the fundamental laser beam passes subsequently. The quarter wavelength plate 19 doubles as circular polarizing device for converting the wavelength-converted laser beam 3C described in connection with the third embodiment into circularly-polarized light.

In other respects, the laser processing apparatus is identical in configuration with the laser processing apparatus of the first embodiment, and hence explanations are primarily given to a difference between the first and fourth embodiments.

The quarter wavelength plate 19 is retained by the holder 20, which is disposed on the base 5. The reflection mirrors 21, 21A are held by mirror holders 7A, 7B, which are disposed behind the quarter wavelength plate 19 on the base S. The power monitor 22 is held by a holder 20A, which is disposed on the base S on the back of the reflection mirror 21. The beam profiler 23 is held by a holder 20B, which is disposed on the base 5 behind the reflection mirror 21A.

The laser radiation device has the reflection mirror 12, the light-gathering optical system 14, and a workbench 18A. The reflection mirror 12 held by a mirror holder 13A, the light-gathering optical system 14 held by an optical system holder 15A, and the workbench 18A is fastened to a base 5B. The workbench 18A holds the workpiece 17, such as silicon, a metal plate, ceramic, a printed board, or a green sheet.

In the laser processing apparatus having the foregoing configuration, the laser beam 3C having passed through the separation mirror 6 is converted into circularly-polarized light (i.e., circularly-polarized) by the quarter wavelength plate 19, whereby the polarization status of the laser beam 3C is converted, to thus produce a wavelength-converted laser beam 3D. The laser beam 3D is substantially identical with the wavelength-converted laser beams generated by the respective nonlinear optical crystals 1A, 1B in terms of ratio between the "s" polarized light component and the "p" polarized light component with reference to the reflection surface of the reflection device (i.e., the reflection mirrors 21, 21A). Specifically, for example, when a component of the wavelength-converted laser beam 3C generated by the wavelength conversion crystal 1A is converted into a clockwise-circularly-polarized light by the quarter wavelength plate 19, a component of the wavelength-converted laser beam 3C generated by the wavelength conversion crystal 1B is converted into counterclockwise-circularly-polarized light by the quarter wavelength plate 19, and hence the wavelength-converted laser beam 3D mixedly includes the clockwise-circularly-polarized light and the counterclockwise-circularly-polarized light.

The circularly-polarized wavelength-converted laser beam 3D is reflected by the reflection mirrors 21, 21A, and 12 and gathered and radiated on the workpiece 17 by the light-gathering optical system 14, to thus machine the workpiece 17 through annealing, surface reforming, boring, cutting, welding, trimming, or the like.

A portion of the circularly-polarized wavelength-converted laser beam 3D passes through the reflection mirror 21. The wavelength-converted laser beam 3E having passed through the reflection mirror 21 enters the power monitor 22, where the power of the laser beam 3E is measured. Further, a portion of the circularly-polarized wavelength-converted laser beam 3D passes through the reflection mirror 21A. The wavelength-converted laser beam 3F having passed through the reflection mirror 21A enters the beam profiler 23, where the profile of the beam is measured.

As has been described, in the embodiment, the laser processing apparatus of the present embodiment has the quarter wavelength plate 19 as device which serves as both circularly-polarizing device and polarized-state conversion device, and the wavelength-converted laser beam 3C is converted into circularly-polarized light. Hence, as in the case of the third embodiment, the circularly-polarized wavelength-converted laser beam 3D is gathered and radiated on the workpiece 17, and hence there is yielded an advantage of the ability to stably perform more uniform processing without dependence on the polarizing direction.

Further, the laser processing apparatus is provided with the power monitor 22 serving as device for monitoring the power of the wavelength-converted laser beam 3D, to thus monitor the power of a wavelength-converted laser beam 3E corresponding to a portion of the circularly-polarized, wavelength-converted laser beam 3D (i.e., the laser beam 3D is formed by converting the polarized status of the wavelength-converted laser beam 3C such that the wavelength-converted laser beams generated by the respective nonlinear optical crystals 1A, 1B become substantially equal in terms of ratio between the "s" polarized light component and the "p" polarized light component, with reference to the reflection surfaces of the reflection mirrors 21, 21A ). As a result of a relationship between the power of the wavelength-converted laser beam 3E and the power of the wavelength-converted laser beam 3D having been grasped beforehand, the sum of the power of a component of the wavelength-converted laser beam 3C generated by the wavelength conversion crystal 1A and a component of the wavelength-converted laser beam 3C generated by the wavelength conversion crystal 1B can be measured substantially accurately. Specifically, the power of the wavelength-converted laser beam 3D output from the wavelength conversion laser can be measured substantially accurately. Therefore, it is possible to ascertain whether or not a high-output wavelength-converted laser beam is generated stably and with high efficiency over a long period of time. Moreover, the power of the wavelength-converted laser beam 3D to be radiated on the workpiece 17 can be measured substantially accurately. Hence, there is yielded an advantage of the ability to ascertain whether or not uniform, highly-accurate processing (i.e., constant in terms of time) can be performed over a long period of time.

The laser processing apparatus is further provided with the beam profiler 23 serving as device for monitoring the profile of the wavelength-converted laser beam 3D, to thus monitor the profile of a wavelength-converted laser beam 3F, which is a portion of the circularly-polarized, wavelength-converted laser beam 3D (i.e., the laser beam 3D is formed by converting the polarized status of the wavelength-converted laser beam 3C such that the wavelength-converted laser beams generated by the respective nonlinear optical crystals 1A, 1B become substantially equal in terms of ratio between the "s" polarized light component and the "p" polarized light component, with reference to the reflection surfaces of the reflection mirrors 21, 21A). Therefore, the sum of the beam profile of a component of the wavelength-converted laser beam 3C generated by the wavelength conversion crystal 1A and the beam profile of the wavelength-converted laser beam 3C generated by the wavelength conversion crystal 1B can be measured substantially accurately. Specifically, the beam profile of the wavelength-converted laser beam 3D output from the wavelength conversion laser can be measured substantially accurately. Therefore, it is possible to ascertain whether or not a high-output wavelength-converted laser beam is generated stably and with high efficiency over a long period of time. Moreover, the beam profile of the wavelength-converted laser beam 3D to be radiated on the workpiece 17 can be measured substantially accurately. Hence, there is yielded an advantage of the ability to ascertain whether or not uniform, highly-accurate processing (i.e., constant in terms of time) can be performed over a long period of time.

The advantage which is obtained by monitoring the power and beam profile of the portion of the wavelength-converted laser beam 3D which is formed as a result of the polarized status of the wavelength-converted laser beam 3C being converted (circularly-polarized) such that the wavelength-converted laser beams generated by the respective nonlinear optical crystals 1A, 1B become substantially equal in terms of ratio between the "s" polarized light component and the "p" polarized light component, with reference to the reflection surfaces of the reflection mirrors 21, 21A is uniquely obtained by the wavelength conversion laser of the invention mixedly including a plurality of linearly-polarized light components. This advantage cannot be obtained by a common linearly-polarized laser or a randomly-polarized laser. Detailed descriptions to this point will be given hereinbelow.

In general, when a laser beam is caused to enter the mirror at an angle other than the perpendicular, a difference arises in the reflectivity of the mirror depending on the polarizing direction of the incident beam, and the reflectivity of "s" polarized light becomes higher than that of "p" polarized light. Specifically, the transmissivity of the "s" polarized light becomes lower than that of the "p" polarized light.

A wavelength conversion laser, serving as a comparative example, will now be described. Specifically, the laser is not provided with the quarter wavelength plate 19 and causes the wavelength-converted laser beam 3C that has not been circularly polarized to enter the reflection mirrors 21, 21A, and the power and beam profile of the wavelength-converted laser beams 3E, 3F that have passed through the reflection mirrors 21, 21A are monitored. For instance, when the wavelength conversion crystals 1A, 1B generate a wavelength-converted laser beam including wavelength-converted laser beams whose polarizing directions differ from each other by 90°, a component of the wavelength-converted laser beam 3C generated by the wavelength conversion crystal 1A is assumed to enter the reflection mirrors 21, 21A as the "s" polarized light, and a component of the wavelength-converted laser beam 3C generated by the wavelength conversion crystal 1B is assumed to enter the reflection mirrors 21, 21A as the "p" polarized light. The transmissivity of the "s" polarized light becomes lower than the transmissivity of "p" polarized light. Hence, the power and beam profile of the component of the wavelength-converted laser beam 3C generated by the wavelength conversion crystal 1B are monitored more closely than are the power and beam profile of the component of the wavelength converted laser beam 3C generated by the wavelength conversion crystal 1A.

Specifically, for instance, when the wavelength-converted laser beam 3C is caused to enter the reflection mirrors 21, 21A at an angle of about 45°, the transmissivity at which the "s" polarized light passes through the reflection mirrors 21, 21A is, for example, about 0.1%, and the transmissivity at which the "p" polarized light passes through the reflection mirrors 21, 21A is, for example, 0.9%. The sum of about 0.1% of the component of the wavelength-converted laser beam 3C generated by the wavelength conversion crystal 1A and about 0.9% of the component of the wavelength-converted laser beam 3C generated by the wavelength conversion crystal 1B enters the power monitor 22 and the beam profiler 23, where the power and beam profile of the sum are measured.

Therefore, for instance, if a change has arisen in the power or beam profile of only the component of the wavelength-converted laser beam 3C generated by the wavelength conversion crystal 1A, a change in readouts of the power monitor 22 and those of the beam profiler 23 is small. Hence, there arises a problem of a failure to accurately monitor a change in the power or beam profile of the wavelength-converted laser beam radiated on the workpiece 17.

In the embodiment, the wavelength-converted laser beam 3D that has been circularly polarized by the quarter wavelength plate 19 (i.e., the polarized status of the wavelength-converted laser beam 3C is converted (circularly-polarized) such that the wavelength-converted laser beams generated by the respective nonlinear optical crystals 1A, 1B become substantially equal in terms of ratio between the "s" polarized light component and the "p" polarized light component, with reference to the reflection surfaces of the reflection mirrors 21, 21A) is caused to enter the reflection mirrors 21, 21A. Hence, the component of the wavelength-converted laser beam 3D that enters the power monitor 22 and the beam profiler 23 and is generated by the wavelength conversion crystal 1A and the component of the wavelength-converted laser beam 3D that enters the power monitor 22 and the beam profiler 23 and is generated by the wavelength conversion crystal 1B comprise the "s" polarized component and the "p" polarized component in substantially equal relative proportions. The power and beam profile of the component of the wavelength-converted laser beam 3D generated by the wavelength conversion crystal 1A and the power and beam profile of the component of the wavelength-converted laser beam 3D generated by the wavelength conversion crystal 1B are monitored in substantially the same relative proportions.

Specifically, for instance, the transmissivity at which the "s" polarized light passes through the reflection mirrors 21, 21A assumes a value of about 0.1%, and the transmissivity at which the "p" polarized light passes through the reflection mirrors 21, 21A assumes a value of about 0.9%. The "s" polarized light component and the "p" polarized light component each account for about 50% of the components of the circularly-polarized wavelength-converted laser beam 3D generated by the wavelength conversion crystal 1A. The sum of about 0.1% of the "s" polarized light component (i.e., about 0.05% of the component of the wavelength-converted laser beam 3D generated by the wavelength conversion crystal 1A) and about 0.9% of the "p" polarized light component (i.e., about 0.45% of the component of the wavelength-converted laser beam 3D generated by the wavelength conversion crystal 1A); that is, about 0.5% of the component of the wavelength-converted laser beam 3D generated by the wavelength conversion crystal 1A, passes through the reflection mirrors 21, 21A. Similarly, the "s" polarized component and the "p" polarized component each account for about 50% of the component of the circularly-polarized, wavelength-converted laser beam 3D generated by the wavelength conversion crystal 1B. Therefore, about 0.5% of the component of the wavelength-converted laser beam 3D generated by the wavelength conversion crystal 1B passes through the reflection mirrors 21, 21A. Therefore, of the wavelength-converted laser beam 3D, the component generated by the wavelength conversion crystal 1A and the component generated by the wavelength conversion crystal 1B enter, in the same proportions, the power monitor 22 and the beam profiler 23, where the power and beam profile of the components are measured.

Therefore, there is yielded the advantage of the ability to essentially accurately measure the power and beam profile of the wavelength-converted laser beam 3D output from the wavelength conversion laser and ascertain whether or not a high-output wavelength-converted laser beam is produced stably and with high efficiency over a long period of time. Therefore, there is yielded an advantage of the ability to substantially accurately measure the power and beam profile of the wavelength-converted laser beam 3D radiated on the workpiece 17 and to ascertain whether or not uniform processing (i.e., uniform in terms of time) can be stably performed with high accuracy over a long period of time.

Moreover, even when a change has arisen in the power and beam profile of only the component of the wavelength-converted laser beam 3C generated by the wavelength conversion crystal 1A, there is yielded an advantage of the ability to substantially accurately monitor a change in the power and beam profile of the wavelength-converted laser beam 3D radiated on the workpiece 17 and to ascertain a change in processing due to the change in the power and beam profile of only the component of the wavelength-converted laser beam 3D generated by the wavelength conversion crystal 1A.

In a common linearly-polarized laser, the polarizing direction of the laser beam entering the reflection mirrors 21, 21A is only "s" polarization or "p" polarization. Therefore, transmissivity remains constant, regardless of whether or not the laser beam is circularly polarized before entering the reflection mirrors 21, 21A. Hence, no new advantage is yielded as a result of monitoring the power and beam profile of the circularly-polarized wavelength-converted laser beam.

Moreover, in a common randomly-polarized laser, the polarizing direction of the laser beam entering the reflection mirrors 21, 21A includes "s" polarized light and "p" polarized light in the equal proportions. Hence, transmissivity remains constant, regardless of whether or not the laser beam is circularly polarized before entering the reflection mirrors 21, 21A. Therefore, no new advantage is yielded as a result of monitoring the power and beam profile of the circularly-polarized wavelength-converted laser beam.

A case where the wavelength conversion crystal 1A, 1B emit wavelength-converted laser beams which differ in polarizing direction from each other by about 90° has been described by mentioning specific numerical values. The same can also apply to a case where the polarizing directions differ from each other by 45° to 90° as well as to a case where the polarizing directions differ from each other by 90°. For instance, the wavelength-converted laser beam 3C is caused to pass through the quarter wavelength plate 19 doubling as the polarization status conversion device and is converted into an elliptically-polarized wavelength conversion laser beam 3D, wherein the laser beam 3D includes, in essentially equal proportions, the "s" polarized light component and the "p" polarized light component of the wavelength-converted laser beams generated by the nonlinear optical crystals 1A, 1B in such a manner that the component stemming from the wavelength conversion crystal 1A includes about 60% "s" polarized light component and about 40% "p" polarized light component and such that the component stemming from the wavelength conversion crystal 1B includes about 60% "s" polarized light component and about 40% "p" polarized light component. Of the wavelength-converted laser beam 3D, the component stemming from the wavelength conversion crystal 1A and that stemming from the wavelength conversion crystal 1B enter, in the same proportions, the power monitor 22 and the beam profiler 23, where the power and beam profile of the components are measured.

FIG. 7 shows a configuration in which the wavelength-converted laser beam reflected from the reflection mirrors 21, 21A is used for processing and in which a beam parameter of the wavelength-converted laser beam having passed through the reflection mirrors 21, 21A is monitored. There may also be adopted a configuration in which the wavelength-converted laser beam having passed through the reflection mirrors 21, 21A is used for processing and in which the beam parameter of the wavelength-converted laser beam having undergone reflection on the reflection mirrors 21, 21A is monitored.

FIG. 7 shows a case where the wavelength conversion laser of the first embodiment has the quarter wavelength plate 19, the reflection mirrors 21, 21A, the power monitor 22, and the beam profiler 23. However, the same advantage may be yielded even when the laser processing apparatus of the second embodiment is provided with the quarter wavelength plate 19, the reflection mirrors 21, 21A, the power monitor 22, and the beam profiler 23.

In addition to having the configuration shown in FIG. 7, the wavelength conversion laser is provided with device for controlling an output of the laser light source 2 in accordance with readouts of the power monitor 22 or device for controlling the temperatures of thermoregulators 4A, 4B in accordance with readouts of the power monitor 22, thereby performing feedback control. As a result, there is yielded the advantage of the ability to maintain the power of the wavelength-converted laser beam 3D stably over a long period of time.

A beam size can be determined from the beam profile measured by the beam profiler 23. Hence, in addition to having the configuration shown in FIG. 7, the wavelength conversion laser is provided with a beam size adjustment mechanism comprising a combination of, e.g., a plurality of lenses, thereby yielding an advantage of the ability to adjust and output a beam size of the wavelength-converted laser beam 3D to an arbitrary value.

Moreover, feedback control is performed by provision of device for controlling the beam size adjustment mechanism in accordance with the beam size measured by the beam profiler 23, thereby yielding the advantage of the ability to stably maintain the beam size of the wavelength-converted laser beam 3D over a long period of time.

The fourth embodiment describes a case where the wavelength conversion laser is provided with device for monitoring the power and the beam profile among beam parameters [i.e., power, a beam profile (beam size), beam quality, and an angle of divergence]. The wavelength conversion laser may be provided with device for monitoring beam quality (an index, such as an $M^2$ value indicating a light-gathering characteristic of the laser beam or a beam product). There is yielded an advantage of the ability to substantially accurately measure the quality of the wavelength-converted laser beam 3D output from the wavelength conversion laser and to ascertain whether or not the high-quality wavelength-converted laser beam is stably generated over a long period of time. Therefore, there is yielded an advantage of the ability to substantially accurately measure the quality of the wavelength-converted laser beam 3D radiated on the workpiece 17 and to ascertain whether or not highly-accurate uniform processing (uniform in terms of time) can be stably performed over a long period of time.

The wavelength conversion laser may be provided with device for monitoring an angle of divergence; e.g., a plurality of beam profilers. There is yielded an advantage of the ability to substantially accurately measure an angle of divergence of the wavelength-converted laser beam 3D output from the wavelength conversion laser and to ascertain whether or not the high-quality wavelength-converted laser beam is stably generated over a long period of time. Therefore, there is yielded an advantage of the ability to substantially accurately measure the angle of divergence of the wavelength-converted laser beam 3D radiated on the workpiece 17 and to ascertain whether or not highly-accurate uniform processing (uniform in terms of time) can be stably performed over a long period of time.

Fifth Embodiment

Figure 8:
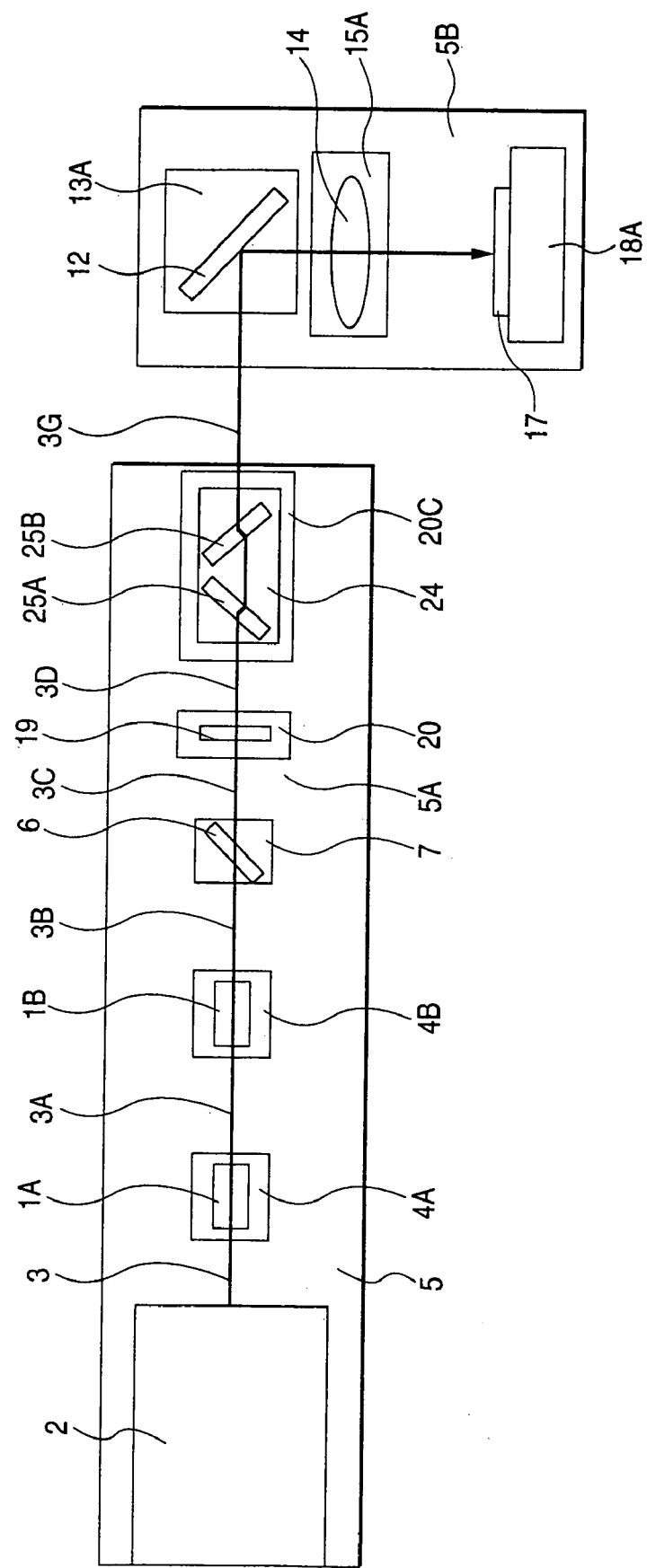
FIG. 8 is a view for describing a wavelength conversion method, a wavelength conversion laser, and a laser processing apparatus according to a fifth embodiment of the invention.

FIG. 8 is a view for describing a wavelength conversion method, a wavelength conversion laser, and a laser processing apparatus according to a fifth embodiment of the invention; more particularly, FIG. 8 is a top view of a laser processing apparatus.

In addition to having the elements of the wavelength conversion laser (i.e., the laser processing apparatus) described in connection with the first embodiment, the laser processing apparatus of the embodiment primarily has the following elements:

First, the laser processing apparatus is provided with a variable attenuator 24 which has variable transmissivity mirrors 25A, 25B serving as device for adjusting the power of the wavelength conversion laser beam 3D and whose transmissivity is variable.

Further, the laser processing apparatus is also provided with the quarter wavelength plate 19 serving as polarization status conversion device. The polarization status conversion device is disposed at a stage before the variable attenuator 24 and converts the polarization status of the wavelength conversion laser beam 3C such that the wavelength-converted laser beams generated by the respective nonlinear optical crystals 1A, 1B are substantially equal in terms of ratio between an "s" polarized light component and a "p" polarized light component, with reference to the reflection surface of the reflection device. Here, the quarter wavelength plate 19 serves also as circular polarization device for converting the wavelength-converter laser beam 3C described in connection with the third embodiment into circularly-polarized light.

In other respects, the fifth embodiment is identical in configuration with the first embodiment, and hence descriptions will be primarily given to a difference between the first and fifth embodiments.

The quarter wavelength plate 19 is retained by the holder 20, which is disposed on the base 5. The variable attenuator 24 is held by the holder 20C, which is disposed on the base 5. Provided in the variable attenuator 24 are the variable transmissivity mirrors 25A, 25B whose transmissivities change depending on the incidence angle of the wavelength-converted laser beam 3C and an unillustrated mechanism for rotating the variable transmissivity mirrors 25A, 25B, to thus change an angle at which the wavelength-converted laser beam 3C enters.

The laser radiation device is identical in configuration with that described in connection with the fourth embodiment.

In the laser processing apparatus having the foregoing configuration, the laser beam 3C having passed through the separation mirror 6 is converted into circularly-polarized light (i.e., circularly-polarized) by the quarter wavelength plate 19, whereby the polarization status of the laser beam 3C is converted, to thus produce the wavelength-converted laser beam 3D. The laser beam 3D is substantially identical with the wavelength-converted laser beams generated by the respective nonlinear optical crystals 1A, 1B in terms of ratio between the "s" polarized light component and the "p" polarized light component with reference to the mirror surfaces of the variable transmissivity mirrors 25A, 25B.

The circularly-polarized wavelength-converted laser beam 3D is converted into-a wavelength-converted laser beam 3G whose power is adjusted by the variable attenuator 24. The wavelength-converted laser beam is then is reflected by the reflection mirror 12 and gathered and radiated on the workpiece 17 by the light-gathering optical system 14, to thus machine the workpiece 17 through annealing, surface reforming, boring, cutting, welding, trimming, or the like.

As has been described, in the embodiment, the laser processing apparatus of the present embodiment has the quarter wavelength plate 19 serving as device which acts as both circularly-polarizing device and polarization status conversion device, and the wavelength-converted laser beam 3C is converted into circularly-polarized light. Hence, as in the case of the third embodiment, the circularly-polarized wavelength-converted laser beam 3D is gathered and radiated on the workpiece 17, and hence there is yielded an-advantage of the ability to stably perform more uniform processing without a dependence on the polarizing direction.

Further, the laser processing apparatus is provided with the variable attenuator 24 serving as device for adjusting the power of the wavelength-converted laser beam 3D, and the circularly-polarized, wavelength-converted laser beam 3D (i.e., the laser beam 3D is formed by converting the polarized status of the wavelength-converted laser beam 3C such that the wavelength-converted laser beams generated by the respective nonlinear optical crystals 1A, 1B become substantially equal in terms of ratio between the "s" polarized light component and the "p" polarized light component, with reference to the mirror surfaces of the variable transmissivity mirrors 25A, 25B) is caused to enter the variable attenuator 24. Hence, the power of the wavelength-converted laser beam 3C generated by the wavelength conversion crystal 1A and the power of the component of the wavelength-converted laser beam 3C generated by the wavelength conversion crystal 1B can be adjusted in the same proportions. Therefore, there is yielded an advantage of the ability to adjust power without substantially changing the beam profile of the wavelength-converted laser beam 3C output from the wavelength conversion laser. For this reason, there are yielded an advantage of the ability to adjust power without substantially changing the beam profile of the wavelength-converted laser beam 3G radiated on the workpiece 17 and an advantage of the ability to perform processing operation by changing only power as a processing parameter.

There is also yielded an advantage of the ability to measure a beam profile which is essentially identical with that achieved during processing, by lowering the transmissivity of the variable attenuator 24, arranging the beam profile at a processing point of a work bench 18A, and measuring the beam profile at the processing point.

The advantage which is obtained by causing the wavelength-converted laser beam 3D to enter the variable attenuator 24 and adjusting the power of the wavelength-converted laser beam 3G by changing the angle at which the wavelength-converted laser beam 3D enters the variable transmissivity mirrors 25A, 25B, wherein the wavelength-converted laser beam 3D is formed by (circularly polarizing) converting the polarized status of the wavelength-converted laser beam 3C such that the wavelength-converted laser beams generated by the respective nonlinear optical crystals 1A, 1B become substantially equal in terms of ratio between the "s" polarized light component and the "p" polarized light component, with reference to the mirror surfaces of the variable transmissivity mirrors 25A, 25B is uniquely obtained by the wavelength conversion laser of the invention mixedly including a plurality of linearly-polarized light components. This advantage cannot be obtained by a common linearly-polarized laser or a randomly-polarized laser. Detailed descriptions to this point will be given hereinbelow.

There will now be described, as a comparative example, a case where the laser is not provided with the quarter wavelength plate 19 and causes the wavelength-converted laser beam 3C that has not been circularly polarized to enter the variable attenuator 24. For instance, when the wavelength conversion crystals 1A, 1B generate a wavelength-converted laser beam including wavelength-converted laser beams whose polarizing directions differ from each other by 90°, a component of the wavelength-converted laser beam 3C generated by the wavelength conversion crystal 1A is assumed to enter the variable transmissivity mirrors 25A, 25B as the "s" polarized light, and a component of the wavelength-converted laser beam 3C generated by the wavelength conversion crystal 1B is caused to enter the variable transmissivity mirrors 25A, 25B as the "p" polarized light. The transmissivity of the "s" polarized light becomes lower than the transmissivity of "p" polarized light. As a result, the wavelength conversion laser outputs the wavelength-converted laser beam including the component of the wavelength-converted laser beam 3C generated by the wavelength conversion crystal 1B in larger quantity than the component of the wavelength-converted laser beam 3C generated by the wavelength conversion crystal 1A, and the thus-emitted wavelength-converted laser beam is radiated on the workpiece 17.

A ratio between the transmissivity of the "s" polarized light and that of the "p" polarized light is changed depending on the transmissivity of the variable attenuator 24 (i.e., the variable transmissivity mirrors 25A, 25B). Hence, only the power of the wavelength-converted laser beam cannot be adjusted by the variable attenuator 24. For instance, when the beam profiler is arranged at the processing point by decreasing the transmissivity of the variable attenuator 24, the ratio between the component of the wavelength-converted laser beam 3C generated by the wavelength conversion crystal 1A and the component of the wavelength-converted laser beam 3C generated by the wavelength conversion crystal 1B, both components being output from the wavelength conversion laser, changes during the period from the time of processing until the time of measurement of a beam profile. Hence, a beam profile which is to be achieved at a processing point and differs from that required during processing is measured.

Specifically, for instance, when processing is performed while the mean transmissivity of the variable attenuator 24 is reduced to about 50%, the transmissivity at which the "s" polarized light passes through the variable transmissivity mirrors 25A, 25B is about 35% and the transmissivity at which the "p" polarized light passes through the variable transmissivity mirrors 25A, 25B is about 65%. The wavelength conversion laser outputs a wavelength-converted laser beam including about 35% the component of the wavelength-converted laser beam 3C generated by the wavelength conversion crystal 1A and about 65% the component of the wavelength-converted laser beam 3C generated by the wavelength conversion crystal 1B; that is, a wavelength-converted laser beam including the component of the wavelength-converted laser beam 3C generated by the wavelength conversion crystal 1A and the component of the wavelength-converted laser beam 3C generated by the wavelength conversion crystal 1B in proportions of 1:1.9. Processing is performed through use of a wavelength-converted laser beam including the component stemming from the wavelength conversion crystal 1A and the component stemming from the wavelength conversion crystal 1B in different proportions.

When a beam profile which is to be achieved at the processing point is measured, for instance, by decreasing the transmissivity of the variable attenuator 24 by about 1% and arranging the beam profiler at the processing point on the workbench 18A, the transmissivity at which the "s" polarized light passes through the variable transmissivity mirrors 25A, 25B assumes a value of about 0.1%, and the transmissivity at which the "p" polarized light passes through the variable transmissivity mirrors 25A, 25B assumes a value of about 0.9%. The wavelength conversion laser emits a wavelength-converted laser beam which is totally different from that emitted during processing; that is, a wavelength-converted laser beam includes about 0.1% the component of the wavelength-converted laser beam 3C generated by the wavelength conversion crystal 1A and about 0.9% the component of the wavelength-converted laser beam 3C generated by the wavelength conversion crystal 1B; specifically, a wavelength-converted laser beam including the component of the wavelength-converted laser beam 3C generated by the wavelength conversion crystal 1A and the component of the wavelength-converted laser beam 3C generated by the wavelength conversion crystal 1B in proportions of 1:9. As a result, there is measured a beam profile of the wavelength-converted laser beam which is different from that achieved when processing is performed at an average transmissivity of about 50% of the foregoing variable attenuator 24, in terms of proportion of the component stemming from the wavelength conversion crystal 1A to the component stemming from the wavelength conversion crystal 1B. Therefore, a beam profile changes during the period from the time of processing until the time of measurement of a beam profile, and a beam profile which is to be achieved during processing cannot be ascertained accurately, thereby raising a problem of a failure to accurately ascertain the influence of the beam profile on processing.

However, in the present embodiment, the wavelength-converted laser beam 3D circularly polarized by the quarter wavelength plate 19 is caused to enter the variable attenuator 24 (wherein the laser beam 3D is formed by converting the polarized status of the wavelength-converted laser beam 3C such that the wavelength-converted laser beams generated by the respective nonlinear optical crystals 1A, 1B become substantially equal in terms of ratio between the "s" polarized light component and the "p" polarized light component, with reference to the mirror surfaces of the variable transmissivity mirrors 25A, 25B). The "s" polarized light component of the wavelength-converted laser beam 3D generated by the wavelength conversion crystal 1A and the "p" polarized light component of the wavelength-converted laser beam 3D become equal in terms of ratio between the "s" polarized light component and the "p" polarized light component, both entering the variable transmissivity mirrors 25A, 25B. The workpiece 17 can be exposed to the wavelength-converted laser beam including in substantially the same proportions the component of the wavelength-converted laser beam 3D generated by the wavelength conversion crystal 1A and the component of the wavelength-converted laser beam 3D generated by the wavelength conversion crystal 1B.

Even when the transmissivity of the variable attenuator 24 has been changed, the component stemming from the wavelength conversion crystal 1A and the component stemming from the wavelength conversion crystal 1B are included in substantially the same proportions, and hence only the power of the wavelength-converted laser beam can be adjusted by the variable attenuator 24 without changing the beam profile. Therefore, for instance, the beam profiler is arranged at a processing point by decreasing the transmissivity of the variable attenuator 24, and a beam profile which is to be achieved at the processing point is measured, thereby enabling measurement of a beam profile substantially identical with that which is to be achieved during processing.

Specifically, for instance, when processing is performed while the mean transmissivity of the variable attenuator 24 is lowered to about 50%, the transmissivity at which the "s" polarized light passes through the variable transmissivity mirrors 25A, 25B assumes a value of about 35%, and the transmissivity at which the "p" polarized light passes through the variable transmissivity mirrors 25A, 25B assumes a value of about 65%. The "s" polarized light component assumes a value of about 50% of the component of the wavelength-converted laser beam 3D generated by the wavelength conversion crystal 1A, and the "p" polarized component also assumes a value of about 50%. The sum of about 35% of the "s" polarized light component (i.e., about 17.5% of the component of the wavelength-converted laser beam 3D generated by the wavelength conversion crystal 1A) and about 65% of the "p" polarized light component (i.e., about 32.5% of the component of the wavelength-converted laser beam 3D generated by the wavelength conversion crystal 1A); that is, about 50% of the component of the wavelength-converted laser beam 3D generated by the wavelength conversion crystal 1A passes through the variable attenuator 24. Similarly, in relation to the component of the wavelength-converted laser beam 3D generated by the wavelength conversion crystal 1B, the "s" polarized light component assumes a value of about 50%, and the "p" polarized light component assumes a value of about 50%. Hence, about 50% of the component of the wavelength-converted laser beam 3D generated by the wavelength conversion crystal 1B passes through the variable attenuator 24.

Therefore, the component of the wavelength-converted laser beam 3D generated by the wavelength conversion crystal 1A and the component of the wavelength-converted laser beam 3D generated by the wavelength conversion crystal 1B pass through the variable attenuator 24 in the same proportions. The wavelength conversion laser emits the wavelength-converted laser beam 3G including, in proportions of about 1:1, the component of the wavelength-converted laser beam 3D generated by the wavelength conversion crystal 1A and the component of the wavelength-converted laser beam 3D generated by the wavelength conversion crystal 1B. Hence, processing is performed through use of the wavelength-converted laser beam 3G including, in proportions of about 1:1, the component of the wavelength-converted laser beam 3D generated by the wavelength conversion crystal 1A and the component of the wavelength-converted laser beam 3D generated by the wavelength conversion crystal 1B.

For instance, when the beam profiler is placed at a processing point by lowering the mean transmissivity of the variable attenuator 24 to about 1% and when a beam profile which is to be achieved at the processing point is measured, the transmissivity at which the "s" polarized light passes through the variable transmissivity mirrors 25A, 25B assumes a value of about 0.1%, and the transmissivity at which the "p" polarized light passes through the variable transmissivity mirrors 25A, 25B assumes a value of about 0.9%. The "s" polarized light component assumes a value of about 50% of the component of the wavelength-converted laser beam 3D generated by the wavelength conversion crystal 1A, and the "p" polarized component also assumes a value of about 50%. The sum of about 0.1% of the "s" polarized light component (i.e., about 0.05% of the component of the wavelength-converted laser beam 3D generated by the wavelength conversion crystal 1A) and about 0.9% of the "p" polarized light component (i.e., about 0.45% of the component of the wavelength-converted laser beam 3D generated by the wavelength conversion crystal 1A); that is, about 0.5% of the component of the wavelength-converted laser beam 3D generated by the wavelength conversion crystal 1A, passes through the variable attenuator 24. Similarly, in relation to the component of the wavelength-converted laser beam 3D generated by the wavelength conversion crystal 1B, the "s" polarized light component assumes a value of about 50%, and the "p" polarized light component assumes a value of about 50%. Hence, about 0.5% of the component of the wavelength-converted laser beam 3D generated by the wavelength conversion crystal 1B passes through the variable attenuator 24.

Therefore, the component of the wavelength-converted laser beam 3D generated by the wavelength conversion crystal 1A and the component of the wavelength-converted laser beam 3D generated by the wavelength conversion crystal 1B pass through the variable attenuator 24 in equal proportions. The wavelength conversion laser emits the wavelength-converted laser beam 3G including, in proportions of about 1:1, the component of the wavelength-converted laser beam 3D generated by the wavelength conversion crystal 1A and the component of the wavelength-converted laser beam 3D generated by the wavelength conversion crystal 1B. Hence, a beam profile to be achieved at the processing point can be measured through use of the wavelength-converted laser beam 3G including, in proportions of about 1:1, the component of the wavelength-converted laser beam 3D generated by the wavelength conversion crystal 1A and the component of the wavelength-converted laser beam 3D generated by the wavelength conversion crystal 1B.

A substantially constant ratio exists at the time of measurement of a beam profile and at the time of processing; specifically, a substantially constant ratio between the component of the wavelength-converted laser beam 3D generated by the wavelength conversion crystal 1A and the component of the wavelength-converted laser beam 3D generated by the wavelength conversion crystal 1B. A beam profile which is to be achieved during processing can be essentially accurately ascertained, and the influence of a beam profile on processing can be essentially accurately ascertained. Further, processing conditions can be changed by observing the beam profile measured at the processing point.

In a common linearly-polarized laser, the polarizing direction of the laser beam entering the variable transmissivity mirrors 25A, 25B is only "s" polarization or "p" polarization. Therefore, transmissivity remains constant, regardless of whether or not the laser beam is circularly polarized before entering the variable transmissivity mirrors 25A, 25B. Hence, no new advantage is yielded as a result of the circularly-polarized wavelength-converted laser beam being caused to enter the variable transmissivity mirrors 25A, 25B.

Moreover, in a common randomly-polarized laser, the polarizing direction of the laser beam entering the variable transmissivity mirrors 25A, 25B includes "s" polarized light and "p" polarized light in equal proportions. Hence, transmissivity remains constant, regardless of whether or not the laser beam is circularly polarized before entering the variable transmissivity mirrors 25A, 25B. Therefore, no new advantage is yielded as a result of the circularly-polarized wavelength-converted laser beam being caused to enter the variable transmissivity mirrors 25A, 25B.

A case where the wavelength conversion crystals 1A, 1B emit wavelength-converted laser beams which differ in polarizing direction from each other by about 90° has been described by mentioning specific numerical values. The same can also apply to a case where the polarizing directions differ from each other by 45° to 90°, as well as to a case where the polarizing directions differ from each other by 90°. For instance, the wavelength-converted laser beam 3C is caused to pass through the quarter wavelength plate 19 doubling as the polarization status conversion device and is converted into an elliptically-polarized wavelength conversion laser beam 3D, wherein the laser beam 3D includes, in essentially equal proportions, the "s" polarized light component and the "p" polarized light component of the wavelength-converted laser beams generated by the nonlinear optical crystals 1A, 1B in such a manner that the component stemming from the wavelength conversion crystal 1A includes about 60% of the "s" polarized light component and about 4.0% of the "p" polarized light component and such that the component stemming from the wavelength conversion crystal 1B includes about 60% of the "s" polarized light component and about 40% of the "p" polarized light component. Of the wavelength-converted laser beam 3D, the component stemming from the wavelength conversion crystal 1A and that stemming from the wavelength conversion crystal 1B enter the variable attenuator 24 in the same proportions. As mentioned above, a substantially constant ratio exists at the time of measurement of a beam profile and at the time of processing; specifically, a substantially constant ratio between the component of the wavelength-converted laser beam 3D generated by the wavelength conversion crystal 1A and the component of the wavelength-converted laser beam 3D generated by the wavelength conversion crystal 1B. A beam profile which is to be achieved during processing can be essentially accurately ascertained, and the influence of a beam profile on processing can be essentially accurately ascertained. Further, processing conditions can be changed by observing the beam profile measured at the processing point.

FIG. 8 shows a case where the wavelength conversion laser is equipped with the quarter wavelength plate 19 and the variable attenuator 24. However, as in the case of the fourth embodiment, the quarter wavelength plate 19, the reflection mirrors 21, 21A and device for monitoring beam parameters, such as the power monitor 22 and the beam profiler 23, may be provided at a stage subsequent to the variable attenuator 24. In such a case, an advantage identical with that yielded in the fourth embodiment is yielded, and there is also yielded an advantage of the ability to substantially accurately monitor the power and beam profile of the wavelength-converted laser beam 3G whose power has been adjusted.

FIG. 8 shows a case where the wavelength conversion laser of the first embodiment has the quarter wavelength plate 19 and the variable attenuator 24. However, the same advantage may be yielded even when the laser processing apparatus of the second embodiment is provided with the quarter wavelength plate 19 and the variable attenuator 24.

Although FIG. 8 has shown a case where the wavelength conversion laser is provided with the variable attenuator 24 whose transmissivity is variable, the wavelength conversion laser may be provided with an attenuator having constant transmissivity. Even in this case, the power of the component of the wavelength-converted laser beam 3C generated by the wavelength conversion crystal 1A and the power of the component of the wavelength-converted laser beam 3C generated by the wavelength conversion crystal 1B can be adjusted in the same proportions. Therefore, there is yielded an advantage of the ability to adjust power by an attenuator having constant transmissivity without involvement of any substantial change in the beam profile of the wavelength-converted laser beam 3G output from the wavelength conversion laser. Consequently, power can be adjusted in accordance with the transmissivity of the attenuator without involvement of any substantial change in the beam profile of the wavelength-converted laser beam 3G radiated on the workpiece 17, thereby yielding an advantage of the ability to perform processing by changing only the power of the laser beam as a processing parameter.

In the fourth and fifth embodiments, the polarization status conversion device, such as the quarter wavelength plate 19, desirably converts the polarization status of the wavelength-converted laser beam such that the wavelength-converted laser beams generated by the respective nonlinear optical crystals 1A, 1B become accurately equal in terms of ratio between an "s" polarized light component and a "p" polarized light component, with reference to the reflection surface of the reflection device (e.g., a mirror surface of the variable transmissivity mirror). However, the essential requirement for yielding the same advantage is that proportions of about 1:4 to 4:1 exist between the value of (the ratio of the "s" polarized light component to the "p" polarized light component in the wavelength-converted laser beam generated by the nonlinear optical crystal 1A) and the value of (the ratio of the "s" polarized light component to the "p" polarized light component in the wavelength-converted laser beam generated by the nonlinear optical crystal 1B).

Specifically, in a case where the "s" polarized light component of the wavelength-converted laser beam generated by the nonlinear optical crystal 1A assumes about 20% and the "p" polarized light component of the same assumes about 80% and where the "s" polarized light component of the wavelength-converted laser beam generated by the nonlinear optical crystal 1B assumes about 50% and the "p" polarized light component of the same assumes about 50%, proportions of 1:4 exist between the value of the ratio of the "s" polarized light component to the "p" polarized light component in the wavelength-converted laser beam generated by the nonlinear optical crystal 1A and the value of the ratio of the "s" polarized light component to the "p" polarized light component in the wavelength-converted laser beam generated by the nonlinear optical crystal 1B. In this case, when processing is performed while the average transmissivity of the variable attenuator 24 is lowered to about 50%, the transmissivity at which the "s" polarized light passes through the variable transmissivity mirrors 25A, 25B assumes a value of about 35%, and the transmissivity at which the "p" polarized light passes through the variable transmissivity mirrors 25A, 25B assumes a value of about 65%. The "s" polarized light component assumes a value of about 20% of the component of the wavelength-converted laser beam 3D generated by the wavelength conversion crystal 1A, and the "p" polarized component also assumes a value of about 80%. Hence, the sum of about 35% of the "s" polarized light component (i.e., about 7% of the component of the wavelength-converted laser beam 3D generated by the wavelength conversion crystal 1A) and about 65% of the "p" polarized light component (i.e., about 52% of the component of the wavelength-converted laser beam 3D generated by the wavelength conversion crystal 1A); that is, about 59% of the component of the wavelength-converted laser beam 3D generated by the wavelength conversion crystal 1A, passes through the variable attenuator 24. Similarly, in relation to the component of the wavelength-converted laser beam 3D generated by the wavelength conversion crystal 1B, the "s" polarized light component assumes a value of about 50%, and the "p" polarized light component assumes a value of about 50%. As mentioned previously, about 50% of the component of the wavelength-converted laser beam 3D generated by the wavelength conversion crystal 1B passes through the variable attenuator 24.

Therefore, the wavelength conversion laser emits the wavelength-converted laser beam 3G including, in proportions of about 1.18:1, the component of the wavelength-converted laser beam 3D generated by the wavelength conversion crystal 1A and the component of the wavelength-converted laser beam 3D generated by the wavelength conversion crystal 1B. Hence, processing is performed through use of the wavelength-converted laser beam 3G including, in proportions of about 1.18:1, the component of the wavelength-converted laser beam 3D generated by the wavelength conversion crystal 1A and the component of the wavelength-converted laser beam 3D generated by the wavelength conversion crystal 1B.

For instance, when the beam profiler is placed at a processing point by lowering the mean transmissivity of the variable attenuator 24 to about 1% and when a beam profile which is to be achieved at the processing point is measured, the transmissivity at which the "s" polarized light passes through the variable transmissivity mirrors 25A, 25B assumes a value of about 0.1%, and the transmissivity at which the "p" polarized light passes through the variable transmissivity mirrors 25A, 25B assumes a value of about 0.9%. The "s" polarized light component assumes a value of about 20% of the component of the wavelength-converted laser beam 3D generated by the wavelength conversion crystal 1A, and the "p" polarized component assumes a value of about 80%. The sum of about 0.1% of the "s" polarized light component (i.e., about 0.02% of the component of the wavelength-converted laser beam 3D generated by the wavelength conversion crystal 1A) and about 0.9% of the "p" polarized light component (i.e., about 0.72% of the component of the wavelength-converted laser beam 3D generated by the wavelength conversion crystal 1A); that is, about 0.8% of the component of the wavelength-converted laser beam 3D generated by the wavelength conversion crystal 1A, passes through the variable attenuator 24. Similarly, in relation to the component of the wavelength-converted laser beam 3D generated by the wavelength conversion crystal 1B, the "s" polarized light component assumes a value of about 50%, and the "p" polarized light component assumes a value of about 50%. Hence, about 0.5% of the component of the wavelength-converted laser beam 3D generated by the wavelength conversion crystal 1B passes through the variable attenuator 24.

Therefore, the component of the wavelength-converted laser beam 3D generated by the wavelength conversion crystal 1A and the component of the wavelength-converted laser beam 3D generated by the wavelength conversion crystal 1B, in the same proportions, pass through the variable attenuator 24. The wavelength conversion laser emits the wavelength-converted laser beam 3G including, in proportions of about 1.6:1, the component of the wavelength-converted laser beam 3D generated by the wavelength conversion crystal 1A and the component of the wavelength-converted laser beam 3D generated by the wavelength conversion crystal 1B. Hence, a beam profile to be achieved at the processing point can be measured through use of the wavelength-converted laser beam 3G including, in proportions of about 1.6:1, the component of the wavelength-converted laser beam 3D generated by the wavelength conversion crystal 1A and the component of the wavelength-converted laser beam 3D generated by the wavelength conversion crystal 1B.

Accordingly, the value of the component of the wavelength-converted laser beam 3D generated by the wavelength conversion crystal 1A differs by about 36% from the value of the component of the wavelength-converted laser beam 3D generated by the wavelength conversion crystal 1B at the time of measurement of a beam profile as well as during processing. Hence, a beam profile which is to be achieved during processing can be essentially accurately ascertained, and the influence of a beam profile on processing can be essentially accurately ascertained. Further, processing conditions can be changed by observing the beam profile measured at the processing point.

The fourth and fifth embodiments have described a case where the quarter wavelength plate 19 is used as the polarization status conversion device for converting the polarization status of the wavelength-converted laser beam such that the wavelength-converted laser beams generated by the respective nonlinear optical crystals 1A, 1B become accurately equal in terms of ratio between an "s" polarized light component and a "p" polarized light component, with reference to the reflection surface of the reflection device (i.e., the reflection mirrors 21, 21A) or the mirror surfaces of the variable transmissivity mirrors 25A, 25B. For example, an electro-optical element for converting a wavelength-converted laser beam into circularly-polarized light may be employed as the polarization status conversion device. Moreover, the polarizing direction of the wavelength-converted laser beam 3C may be rotated through use of, e.g., a half wavelength plate, a polarizing rotator, or an electro-optical element, serving as the polarization status conversion device, such that the ratio of the "s" polarized light component to the "p" polarized light component in the wavelength-converted laser beam 3C generated by the wavelength conversion crystal 1A with respect to the reflection surface (i.e., the mirror surface) of each of the mirrors becomes substantially equal to the ratio of the "s" polarized light component to the "p" polarized light component in the wavelength-converted laser beam 3C generated by the wavelength conversion crystal 1B with respect to the reflection surface (i.e., the mirror surface) of each of the mirrors. Thus, there is yielded the same advantage as that yielded in the fourth and fifth embodiments.

In the fourth and fifth embodiments, there is adopted a configuration in which, for instance, the wavelength conversion crystals 1A, 1B generate a wavelength-converted laser beam including wavelength-converted laser beams whose polarizing directions differ by 90°; and in which the component of the wavelength-converted laser beam 3C generated by the wavelength conversion crystal 1A is caused to enter the reflection mirrors 21, 21A (or the variable transmissivity mirrors 25A, 25B) as "s" polarized light and the component of the wavelength-converted laser beam 3C generated by the wavelength conversion crystal 1B is caused to enter the reflection mirrors 21, 21A (or the variable transmissivity mirrors 25A, 25B) as "p" polarized light. In this case, when the nonlinear optical crystals 1A, 1B and the separation mirror 6 are arranged while being rotated through about 45° around the optical axis of the laser beam 3, the wavelength-converted laser beams generated by the respective nonlinear optical crystals 1A, 1B become approximately equal in terms of ratio between an "s" polarized light component and a "p" polarized light component, with reference to the reflection surfaces of the reflection mirrors 21, 21A. Hence, the polarization status conversion device may be dispensed with. Even in this case, as a result of the wavelength conversion laser being provided with the circular polarization device, such as the quarter wavelength plate 19, a circularly-polarized wavelength-converted laser beam is gathered and radiated on the workpiece 17 in the same manner as described in connection with the third embodiment, and hence there is yielded an advantage of the ability to stably effect uniform processing without dependence on a polarizing direction.

The respective embodiments have described a case where an Nd(neodymium):YAG laser for generating the randomly-polarized fundamental laser beam 3 of 1064 nm is employed as the laser light source 2. However, the type of the laser light source 2 is not limited to Nd(neodymium):YAG. For instance, there may be employed a gas laser such as an argon laser or an excimer laser, or a liquid laser such as a dye laser, as well as a solid-state laser such as an Nd:YLF laser, an Nd:YVO$_4$ laser, or a Ti:Al$_2$O$_3$ (titanium sapphire) laser. However, a case may often arise where a laser effects linearly-polarized oscillation as in the case of the Nd:YVO$_4$ laser but does not cause any randomly-polarized oscillation. However, randomly-polarized oscillation can be caused, so long as the cutting direction of a solid-state laser medium is aligned in a direction different from that in which the medium is usually cut.

The respective embodiments show a case where a nonlinear optical crystal which generates a second harmonic by type-2 phase matching is used as the wavelength conversion crystals 1A, 1B. However, since the randomly-polarized fundamental laser beam 3 is used, the type of phase matching may be type 1, in which case there is yielded the same advantage as that yielded in the respective embodiments.

The respective embodiments show a case where the lithium borate crystal (chemical formula: LiB$_3$O$_5$) which generates a second harmonic through type-2 phase matching is used for the wavelength conversion crystals 1A, 1B. However, the wavelength conversion laser beam to be generated is not limited to the second harmonic. For instance, a third harmonic, a fourth harmonic, a fifth harmonic, a sum frequency, or a difference frequency may also be employed, and in each of these cases there is yielded the same advantage as that yielded in the respective embodiments.

Moreover, the nonlinear optical crystals (wavelength conversion crystals) 1A, 1B for wavelength conversion purpose are not limited to the lithium borate crystal (chemical formula: LiB$_3$O$_5$). For instance, there may also be employed a cesium-lithium-borate (chemical formula: CsLiB$_6$O$_{10}$, abbreviated designation: CLBO) crystal; a cesium borate (chemical formula: CsB$_3$O$_5$, abbreviated designation: CBO) crystal; a beta-barium-borate (chemical formula: β-BaB$_2$O$_4$, abbreviated designation: BBO) crystal; a gadolinium-yttrium-calcium-oxyborate (chemical formula: Gd$_x$Y$_{1-x}$Ca$_4$(BO$_3$)$_3$, abbreviated designation: GdYCOB) crystal, or a potassium-titanium-phosphate (chemical formula KTiOPO$_4$, abbreviated designation: KTP), or the like, and in each of these cases there is yielded the same advantage as that yielded in the respective embodiments.

The respective embodiments show a case where crystals of the same types are used for the wavelength conversion crystals 1A, 1B. However, crystals of different types may be used in combination; for instance, a lithium borate crystal (chemical formula: LiB$_3$O$_5$) is used for the wavelength conversion crystal 1A, and a cesium-lithium-borate (chemical formula: CsLiB$_6$O$_{10}$, abbreviated designation: CLBO) crystal is used for the wavelength conversion crystal 1B. In this case, the only requirement is to arrange the wavelength conversion crystals 1A, 1B such that the polarizing direction of the wavelength-converted laser beam which has generated from the wavelength conversion crystal 1A and enters the wavelength conversion crystal 1B differs from the polarizing direction of the wavelength-converted laser beam generated by the wavelength conversion crystal 1B, by 45° to 90° (desirably about 90°). More specifically, the only requirement is to arrange the wavelength conversion crystals 1A, 1B such that the polarizing direction of the wavelength-converted laser beam which has generated from the wavelength conversion crystal 1A and enters the wavelength conversion crystal 1B differs from the polarizing direction of the wavelength-converted laser beam generated by the wavelength conversion crystal 1B, by 45° to 90° (desirably about 90°); in other words, to generate the wavelength-converted laser beam 3C including wavelength-converted laser beams whose polarizing directions differ by 45° to 90° (desirably about 90°). In each of these cases, there is yielded the same advantage as that yielded in the respective embodiments.

Moreover, a crystal which is superior to the wavelength conversion crystal 1A in terms of wavelength conversion efficiency is used for the wavelength conversion crystal 1B. As a result, even when the nonlinear optical crystals 1A, 1B have the same length with respect to the direction in which the laser beam passes through the crystals, the power of the wavelength-converted laser beam generated by the wavelength conversion crystal 1A disposed on a first stage and the power of the wavelength-converted laser beam generated by the wavelength conversion crystal 1B disposed on a second stage can be made close to each other, there is yielded an advantage of the ability to bring the wavelength-converted laser beam 3C in a polarized state close to isotropy.

The respective embodiments have shown the configuration of the wavelength conversion laser that does not use a light-gathering lens. However, a light-gathering lens may be interposed between the laser light source 2 and the wavelength conversion crystal 1A or between the wavelength conversion crystals 1A, 1B. In addition to the advantages of the respective embodiments being yielded, the diameter of the fundamental laser beam entering the wavelength conversion crystals 1A, 1B can be adjusted. Hence, the power of the wavelength-converted laser beam generated by the wavelength conversion crystal 1A disposed on a first stage and the power of the wavelength-converted laser beam generated by the wavelength conversion crystal 1B disposed on a second stage can be made more close to each other, and there is yielded an advantage of the ability to bring the wavelength-converted laser beam 3C in a polarized state close to isotropy.

The respective embodiments have described the case of the laser radiation device where the light gathering optical system 14 is interposed between the reflection mirror 12 and the workbench 18 (i.e., the workpiece 17). However, the light gathering optical system 14 may be interposed between the separation mirror 6 and the reflection mirror 12. Moreover, the wavelength conversion laser may be further provided with, e.g., an element for rendering a beam uniform, such as a fly eye lens, or a mask for permitting passage of only a center of a laser beam. In addition to yielding the same advantages as those yielded in the respective embodiments, there is yielded an advantage of the ability to stably effect more uniform processing.

The respective embodiments have described a case where the wavelength converter causes the fundamental laser beam to travel in one direction, to thus subject the laser beam to wavelength conversion through use of nonlinear optical crystals for wavelength conversion purpose (i.e., the wavelength conversion crystals 1A, 1B). Specifically, the embodiments have described a case where the laser beam is subjected to wavelength conversion outside a resonator for generating a fundamental laser beam. However, a laser processing method of the invention is not limited to the embodiments. A wavelength conversion apparatus of any configuration may be adopted, so long as the configuration has two nonlinear optical crystals for wavelength conversion arranged in tandem and causes a fundamental: laser beam to pass through the two nonlinear optical crystals, to thus subject the laser beam to wavelength conversion such that the polarizing directions differ from each other by 45° to 90° (desirably by about 90°) by the nonlinear optical crystals.

What is claimed is:

1. A wavelength conversion method comprising passing a randomly polarized fundamental laser beam, having a first wavelength, along an optical axis of the fundamental laser beam serially through first and second nonlinear optical crystals for wavelength conversion, the second nonlinear optical crystal having a longer length along the optical axis of the fundamental laser beam than the first nonlinear optical crystal, generating wavelength-converted laser beams having the same wavelength at outputs of each of the first and second nonlinear optical crystals for wavelength conversion, the wavelength-converted laser beams having respective directions of polarization differing from each other by an angle in a range from 45° to 90°.

2. The wavelength conversion method according to claim 1, wherein the directions of polarization of the wavelength-converted laser beams differ from each other by about 90°.

3. The wavelength conversion method according to claim 1, including converting directions of polarization of the wavelength-converted laser beams so that the wavelength-converted laser beams generated by the first and second nonlinear optical crystals for wavelength conversion are substantially equal in ratio of "s" polarized light component to "p" polarized light component, with reference to surfaces the laser beams enter.

4. The wavelength conversion method according to claim 3, including directing the wavelength-convened laser beams into a reflection device for passage of a portion of one of the wavelength-converted laser beams, and monitoring a beam parameter of one of (i) the wavelength-convened laser beam that has passed through the reflection device and (ii) the wavelength-converted laser beam that has been reflected by the reflection device.

5. The wavelength conversion method according to claim 4, wherein the beam parameter to be monitored is one of power and beam profile.

6. A wavelength conversion apparatus comprising:
a fundamental light source for generating a randomly polarized fundamental laser beam, having a first wavelength, along an optical axis of the fundamental laser beam; and first and second nonlinear optical crystals for wavelength conversion arranged in series along the optical axis of the fundamental laser beam, the second nonlinear optical crystal having a longer length along the optical axis of the fundamental laser beam than the first nonlinear optical crystal, for generating wavelength-convened laser beams having the same wavelength at outputs of each of the first and second nonlinear optical crystals for wavelength conversion, the wavelength-converted laser beams having respective directions of polarization that differ from each other by an angle in a range from 45° to 90°.

7. The wavelength conversion apparatus according to claim 6, wherein orientation of crystalline axes of the first and second nonlinear optical crystals for wavelength conversion differ by an angle in a range from 45° to 90°, when viewed along the optical axis of the fundamental laser beam.

8. The wavelength conversion apparatus according to claim 7, wherein the orientation of the crystalline axes of the first and second nonlinear optical crystals for wavelength conversion differ by about 90° 0 when viewed along the optical axis of the fundamental laser beam.

9. The wavelength conversion apparatus according to claim 7, further comprising a circularly-polarizing device for converting one of the wavelength-converted laser beams into circularly polarized light.

10. The wavelength conversion apparatus according to claim 6, wherein crystalline axes of the first and second nonlinear optical crystals for wavelength conversion are aligned in the same direction or in opposite directions of about 180°, when viewed along the optical axis of the fundamental laser beam, and comprising a polarizing direction rotation device disposed between the first and second nonlinear optical crystals for wavelength conversion and which rotates direction of polarization of a laser beam by 45° to 90°.

11. The wavelength conversion apparatus according to claim 10, wherein the polarizing direction rotation device rotates the direction of polarization of one of the wavelength-converted laser beams through about 90°, and the wavelength-converted laser beams have directions of polarization differing from each other by about 90°.

12. The wavelength conversion apparatus according to claim 10, further comprising a circularly polarizing device for converting one of the wavelength-convened laser beams into circularly polarized light.

13. A laser processing method comprising:
passing a randomly polarized fundamental laser beam having a first wavelength, along an optical axis of the fundamental laser beam, serially through first and second nonlinear optical crystals for wavelength conversion, the second nonlinear crystal having a longer length along the optical axis of the fundamental laser beam than the first nonlinear optical crystal, generating wavelength-converted laser beams having, at outputs of each of the first and second nonlinear optical crystals for wavelength conversion, the same wavelength and directions of polarization differing from each other by an angle in a range from 45° to 90°;
converting the wavelength-converted laser beams into circularly polarized light; and
directing the circularly polarized light onto a workpiece.

14. The wavelength conversion method according to claim 1, wherein the first and second nonlinear optical crystals for wavelength conversion have the same composition.

15. The wavelength conversion apparatus according to claim 6, wherein the first and second nonlinear optical crystals for wavelength conversion have the same composition.

16. The laser processing method according to claim 13, wherein the first and second nonlinear optical crystals have the same composition.

* * * * *